United States Patent
Han et al.

(10) Patent No.: US 12,554,575 B2
(45) Date of Patent: Feb. 17, 2026

(54) DATA PROCESSING METHOD AND APPARATUS

(71) Applicant: HUAWEI TECHNOLOGIES CO., LTD., Guangdong (CN)

(72) Inventors: Yung Hsiang Han, Shenzhen (CN); Yi Ning Sun, Hong Kong (CN); Sian Jheng Lin, Hong Kong (CN); Buchan Li, Chengdu (CN); Bo Bai, Hong Kong (CN); Gong Zhang, Shenzhen (CN); Jiafeng Chen, Shenzhen (CN); Bingxu Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/442,304

(22) Filed: Feb. 15, 2024

(65) Prior Publication Data

US 2024/0184665 A1    Jun. 6, 2024

Related U.S. Application Data

(63) Continuation of application No. PCT/CN2022/100617, filed on Jun. 23, 2022.

(30) Foreign Application Priority Data

Aug. 18, 2021   (CN) .......................... 202110950868.8

(51) Int. Cl.
G06F 11/10    (2006.01)

(52) U.S. Cl.
CPC ........ *G06F 11/1004* (2013.01); *G06F 11/102* (2013.01)

(58) Field of Classification Search
CPC . G06F 11/1004; G06F 11/102; G06F 11/1012
(Continued)

(56) References Cited

U.S. PATENT DOCUMENTS

| | | | | |
|---|---|---|---|---|
| 10,558,525 B2 * | 2/2020 | Chih | .................. | G06F 11/1012 |
| 2014/0173377 A1 * | 6/2014 | Horisaki | ............. | G06F 11/1048 |
| | | | | 714/755 |

(Continued)

FOREIGN PATENT DOCUMENTS

| | | |
|---|---|---|
| WO | 2007074441 A1 | 7/2007 |
| WO | 2018226278 A1 | 12/2018 |

*Primary Examiner* — Albert Decady
*Assistant Examiner* — Osman M Alshack
(74) *Attorney, Agent, or Firm* — WOMBLE BOND DICKINSON (US) LLP

(57) ABSTRACT

This application provide a data processing method and apparatus, to store more user data in a limited quantity of storage chips in a design manner of reusing storage space corresponding to a second storage chip. In the method, a computer device first obtains user data, where the user data includes first data and second data. Then, the device writes the first data into a first storage chips, where a is an integer greater than 0. The device writes the second data and first check data into b second storage chips, where the first check data includes check data for the user data, and b is an integer greater than 0. In addition, the device writes second check data into c third storage chips, where the second check data includes check data for both the user data and the first check data, and c is an integer greater than 0.

17 Claims, 8 Drawing Sheets

---

S101: Obtain user data

S102: Write first data into a first storage chips, write second data and first check data into b second storage chips, and write second check data into c third storage chips

(58) Field of Classification Search
USPC .................................................. 714/763, 764
See application file for complete search history.

(56) References Cited

U.S. PATENT DOCUMENTS

| | | | |
|---|---|---|---|
| 2018/0101424 A1* | 4/2018 | Lim | G06F 11/073 |
| 2018/0152206 A1* | 5/2018 | Sin | H03M 13/2906 |
| 2018/0358989 A1* | 12/2018 | Mehra | H03M 13/2918 |
| 2019/0138230 A1* | 5/2019 | Lim | G11C 29/42 |
| 2019/0296774 A1* | 9/2019 | Uchikawa | G06F 11/1012 |
| 2020/0159668 A1* | 5/2020 | Chae | G06F 3/0607 |
| 2020/0278905 A1* | 9/2020 | Li | G11C 29/52 |
| 2020/0278908 A1* | 9/2020 | Schaefer | G11C 7/1018 |
| 2020/0402605 A1* | 12/2020 | Subbarao | G11C 11/5635 |
| 2021/0357287 A1* | 11/2021 | Kim | H03M 13/1575 |
| 2022/0013190 A1* | 1/2022 | Na | G11C 29/42 |

* cited by examiner

DATA PROCESSING METHOD AND APPARATUS

CROSS-REFERENCE TO RELATED APPLICATIONS

This application is a continuation of International Application No. PCT/CN2022/100617, filed on Jun. 23, 2022, which claims priority to Chinese Patent Application No. 202110950868.8, filed on Aug. 18, 2021. The disclosures of the aforementioned applications are hereby incorporated by reference in their entireties.

TECHNICAL FIELD

This application relates to the field of data storage, and in particular, to a data processing method and apparatus.

BACKGROUND

With development of science and technologies, storage technologies used to store data are also continuously updated. Common data storage technologies include video memory storage, cache storage, memory storage, running memory storage, flash memory storage, and the like. Usually, a physical storage component unit used to store data may be referred to as a storage chip. A process of inputting data into the storage chip may be referred to as writing, and a process of outputting data from the storage chip may be referred to as reading.

Currently, to avoid a data error caused by chip-kill, data tampering, or the like, check data may be introduced in a data storage process, and the check data is used for data error detection, data error correction, and the like. In a current storage manner, a storage medium usually includes a plurality of storage chips. In addition, storage space corresponding to a part of the storage chips is used to store user data, and storage space corresponding to the other part of the storage chips is used to store check data.

However, in the foregoing design in which the user data can be stored only in the part of the storage chips, if more user data is intended to be stored, the storage space of the part of the storage chips may be insufficient. In this case, a large amount of user data can be stored only by discarding a part of the user data or by disposing an additional storage chip.

Therefore, how to optimize the storage medium to store more user data in a limited quantity of storage chips is an urgent technical problem that needs to be resolved.

SUMMARY

Embodiments of this application provide a data processing method and apparatus, to store more user data in a limited quantity of storage chips in a design manner of reusing storage space corresponding to a second storage chip, optimize a data storage manner, and improve storage space utilization of a storage medium.

A first aspect of embodiments of this application provides a data processing method, used in a process of writing data into a plurality of storage chips. The method is performed by a computer device, or the method is performed by a component (for example, a processor, a chip, or a chip system) in the computer device. In the method, the computer device first obtains user data, where the user data includes first data and second data. Then, the device writes the first data into a first storage chips, where a is an integer greater than 0. The device writes the second data and first check data into b second storage chips, where the first check data includes check data for the user data, and b is an integer greater than 0. In addition, the device writes second check data into c third storage chips, where the second check data includes check data for both the user data and the first check data, and c is an integer greater than 0.

Based on the foregoing technical solution, after the computer device obtains the user data that needs to be stored and that includes the first data and the second data, in a process in which the computer device writes the user data into storage chips in a storage medium, in an embodiment, the computer device separately stores the first data in the a first storage chips, and stores the second data in the b second storage chips different from the first storage chips. The device further writes the first check data into the b second storage chips, where the first check data includes the check data for the user data. In other words, the computer device places the second data in the user data and the first check data for the user data into the second storage chips, so that a part of data in the user data and a part of data in the check data share a same storage chip. Compared with a current design in which the user data can be stored only in a part of storage chips, in a design manner of reusing storage space corresponding to the second storage chip, a case in which a large amount of user data can be stored only by discarding a part of the user data or by setting an additional storage chip is avoided, to store more user data in a limited quantity of storage chips, optimize a data storage manner, and improve storage space utilization of a storage medium.

In an embodiment, the second data is metadata, and the metadata includes descriptive metadata, structured metadata, administrative metadata, reference metadata, statistical metadata, or legal metadata.

Based on the foregoing technical solution, user data that shares a same storage chip with a part of data in the check data is the second data. The second data may be data associated with the first data. For example, the second data may be metadata. In addition, the second data may be the descriptive metadata, the structured metadata, the administrative metadata, the reference metadata, the statistical metadata, the legal metadata, or metadata of another type. This is not limited herein.

In an embodiment, the second data is not data associated with the first data, or in other words, the second data is not associated with the first data, or in other words, the second data is independent of the first data.

In an embodiment, a quantity of bits corresponding to the first data in each of the a first storage chips, a quantity of bits corresponding to the second data and the first check data in each of the b second storage chips, and a quantity of bits corresponding to the second check data in each of the c third storage chips are the same.

Based on the foregoing technical solution, in a process in which data is written into a plurality of storage chips, data related to a check process includes: the first data, the second data, the first check data, and the second check data. The quantity of bits corresponding to the first data in each of the a first storage chips, the quantity of bits corresponding to the second data and the first check data in each of the b second storage chips, and the quantity of bits corresponding to the second check data in each of the c third storage chips are the same. Therefore, in the process in which the data is written into the plurality of storage chips, data that is of a same quantity of bits and that is related to the check process is separately written into the plurality of storage chips. This facilitates implementation of the solution. In addition, because each storage chip has data that is related to the check process, each storage chip is checked in a subsequent process of performing check based on the data.

In an embodiment, the quantity of bits corresponding to the first data in each of the a first storage chips, the quantity of bits corresponding to the second data and the first check data in each of the b second storage chips, and the quantity of bits corresponding to the second check data in each of the c third storage chips are different in pairs.

In an embodiment, at least two quantities of bits in the quantity of bits corresponding to the first data in each of the a first storage chips, the quantity of bits corresponding to the second data and the first check data in each of the b second storage chips, and the quantity of bits corresponding to the second check data in each of the c third storage chips are the same.

In an embodiment, a storage space size of each of the a first storage chips, a storage space size of each of the b second storage chips, and a storage space size of each of the c third storage chips are the same.

Based on the foregoing technical solution, a plurality of storage chips corresponding to the first storage chips, the second storage chips, and the third storage chips that are used to store different data may use same storage space, that is, any one of the plurality of storage chips stores a same quantity of bits. In this way, physical specifications of different storage chips used to store different data are the same, and this facilitates implementation of the solution.

In an embodiment, a storage space size of each of the a first storage chips, a storage space size of each of the b second storage chips, and a storage space size of each of the c third storage chips are different in pairs.

In an embodiment, at least two storage space sizes in a storage space size of each of the a first storage chips, a storage space size of each of the b second storage chips, and a storage space size of each of the c third storage chips are the same.

In an embodiment, the first check data includes a plurality of pieces of bit information, and each of the plurality of pieces of bit information in the first check data is check data for the user data.

Based on the foregoing technical solution, the first check data includes the check data for the user data. The first check data may include the plurality of pieces of bit information, and each of the plurality of pieces of bit information is the check data for the user data (including the first data and the second data). In this way, the first data and the second data are checked by using each piece of bit information included in the first check data.

In an embodiment, the second check data includes a plurality of pieces of bit information, first bit information in the plurality of pieces of bit information in the second check data is check data for both the user data and the first check data, and second bit information in the plurality of pieces of bit information in the second check data is check data for both the first data and the first check data.

Based on the foregoing technical solution, the second check data includes the check data for both the user data and the first check data. The second check data may include the plurality of pieces of bit information, at least one piece of bit information (that is, the first bit information) in the plurality of pieces of bit information is the check data for both the user data and the first check data, and at least one piece of bit information (that is, the second bit information) in the plurality of pieces of bit information is the check data for both the first data and the first check data. In other words, a part of data in the second check data is used to check the first data, the second data, and the first check data, and a part of data in the second check data is used to check the first data and the first check data. In this way, different data is checked by using different bit information included in the second check data.

In an embodiment, a quantity of bits in the first bit information is equal to a quantity of bits of the second data.

Based on the foregoing technical solution, the first bit information included in the second check data is the check data for both the user data and the first check data. The user data includes the first data and the second data. In other words, the first bit information is used to check at least the second data. Therefore, the first bit information may be used to check the second data by setting the quantity of bits in the first bit information to be the same as the quantity of bits of the second data.

In an embodiment, both a value of b and a value of c are 1.

Based on the foregoing technical solution, a value of the quantity b of second storage chips used to store the first check data is 1, and a value of the quantity c of third storage chips used to store the second check data is 1. Compared with an implementation in which the value of b (or c) is greater than 1, a quantity of storage chips used to store check data is minimized, to maximize a quantity of storage chips used to store user data when a total quantity of storage chips is given.

In an embodiment, the value of b is greater than 1. Each of the b storage chips includes a part of data in the second data and a part of data in the first check data.

In an embodiment, the first check data is check data obtained by encoding the user data based on a first encoding scheme and an m-order primitive polynomial, and m is an integer greater than 0.

In an embodiment, a value of a is an integer greater than 1 and less than or equal to $2^m-2$.

In an embodiment, a quantity of bits stored in each of the first storage chips, a quantity of bits stored in each of the second storage chips, and a quantity of bits stored in each of the third storage chips are the same, a value is m+1, m+2, or m+k, and k is an integer greater than 2.

In an embodiment, the first check data is cyclic redundancy check (CRC) check data.

In an embodiment, the second check data is parity check data.

A second aspect of embodiments of this application provides a data processing method, used in a process of reading data from a plurality of storage chips. The method is performed by a computer device, or the method is performed by a component (for example, a processor, a chip, or a chip system) in the computer device. In the method, the computer device first reads first data from a first storage chips, where the first data is included in user data, the user data further includes second data, and a is an integer greater than 0. In addition, the computer device reads the second data and first check data from b second storage chips, where the first check data includes check data for the user data, and b is an integer greater than 0. The computer device reads second check data from c third storage chips, where the second check data includes check data for both the user data and the first check data, and c is an integer greater than 0. Then, the computer device checks the user data based on the first check data and the second check data.

Based on the foregoing technical solution, in a process in which the computer device reads the user data from storage chips in a storage medium, the computer device separately reads the first data from the a first storage chips, and reads the second data from the b second storage chips. The computer device further reads the first check data from the b second storage chips. In other words, the second data in the user data and the first check data for the user data are read from the second storage chips, so that a part of data in the user data and a part of data in the check data are read from a same storage chip. Compared with a current design in which the user data can be stored only in a part of storage chips, in a design manner of reusing storage space corresponding to the second storage chip, a case in which a large amount of user data can be stored only by discarding a part of the user data or by setting an additional storage chip is avoided, to store more user data in a limited quantity of storage chips, optimize a data storage manner, and improve storage space utilization of a storage medium.

In an embodiment, the second data is metadata, and the metadata includes descriptive metadata, structured metadata, administrative metadata, reference metadata, statistical metadata, or legal metadata.

Based on the foregoing technical solution, user data that shares a same storage chip with a part of data in the check data is the second data. The second data may be data associated with the first data. For example, the second data may be metadata. In addition, the second data may be the descriptive metadata, the structured metadata, the administrative metadata, the reference metadata, the statistical metadata, the legal metadata, or metadata of another type. This is not limited herein.

In an embodiment, the second data is not data associated with the first data, or in other words, the second data is not associated with the first data, or in other words, the second data is independent of the first data.

In an embodiment, a quantity of bits corresponding to the first data in each of the a first storage chips, a quantity of bits corresponding to the second data and the first check data in each of the b second storage chips, and a quantity of bits corresponding to the second check data in each of the c third storage chips are the same.

Based on the foregoing technical solution, in a process in which data is written into a plurality of storage chips, data related to a check process includes: the first data, the second data, the first check data, and the second check data. The quantity of bits corresponding to the first data in each of the a first storage chips, the quantity of bits corresponding to the second data and the first check data in each of the b second storage chips, and the quantity of bits corresponding to the second check data in each of the c third storage chips are the same. Therefore, in the process in which the data is written into the plurality of storage chips, data that is of a same quantity of bits and that is related to the check process is separately written into the plurality of storage chips. This facilitates implementation of the solution. In addition, because each storage chip has data that is related to the check process, each storage chip is checked in a subsequent process of performing check based on the data.

In an embodiment, the quantity of bits corresponding to the first data in each of the a first storage chips, the quantity of bits corresponding to the second data and the first check data in each of the b second storage chips, and the quantity of bits corresponding to the second check data in each of the c third storage chips are different in pairs.

In an embodiment, at least two quantities of bits in the quantity of bits corresponding to the first data in each of the a first storage chips, the quantity of bits corresponding to the second data and the first check data in each of the b second storage chips, and the quantity of bits corresponding to the second check data in each of the c third storage chips are the same.

In an embodiment, a storage space size of each of the a first storage chips, a storage space size of each of the b second storage chips, and a storage space size of each of the c third storage chips are the same.

Based on the foregoing technical solution, a plurality of storage chips corresponding to the first storage chips, the second storage chips, and the third storage chips that are used to store different data may use same storage space, that is, any one of the plurality of storage chips stores a same quantity of bits. In this way, physical specifications of different storage chips used to store different data are the same, and this facilitates implementation of the solution.

In an embodiment, a storage space size of each of the a first storage chips, a storage space size of each of the b second storage chips, and a storage space size of each of the c third storage chips are different in pairs.

In an embodiment, at least two storage space sizes in a storage space size of each of the a first storage chips, a storage space size of each of the b second storage chips, and a storage space size of each of the c third storage chips are the same.

In an embodiment, the first check data includes a plurality of pieces of bit information, and each of the plurality of pieces of bit information in the first check data is check data for the user data.

Based on the foregoing technical solution, the first check data includes the check data for the user data. The first check data may include the plurality of pieces of bit information, and each of the plurality of pieces of bit information is the check data for the user data (including the first data and the second data). In this way, the first data and the second data are checked by using each piece of bit information included in the first check data.

In an embodiment, the second check data includes a plurality of pieces of bit information, first bit information in the plurality of pieces of bit information in the second check data is check data for both the user data and the first check data, and second bit information in the plurality of pieces of bit information in the second check data is check data for both the first data and the first check data.

Based on the foregoing technical solution, the second check data includes the check data for both the user data and the first check data. The second check data may include the plurality of pieces of bit information, at least one piece of bit information (that is, the first bit information) in the plurality of pieces of bit information is the check data for both the user data and the first check data, and at least one piece of bit information (that is, the second bit information) in the plurality of pieces of bit information is the check data for both the first data and the first check data. In other words, a part of data in the second check data is used to check the first data, the second data, and the first check data, and a part of data in the second check data is used to check the first data and the first check data. In this way, different data is checked by using different bit information included in the second check data.

In an embodiment, a quantity of bits in the first bit information is equal to a quantity of bits of the second data.

Based on the foregoing technical solution, the first bit information included in the second check data is the check data for both the user data and the first check data. The user data includes the first data and the second data. In other words, the first bit information is used to check at least the second data. Therefore, the first bit information may be used to check the second data by setting the quantity of bits in the first bit information to be the same as the quantity of bits of the second data.

In an embodiment, both a value of b and a value of c are 1.

Based on the foregoing technical solution, a value of the quantity b of second storage chips used to store the first check data is 1, and a value of the quantity c of third storage chips used to store the second check data is 1. Compared with an implementation in which the value of b (or c) is greater than 1, a quantity of storage chips used to store check data is minimized, to maximize a quantity of storage chips used to store user data when a total quantity of storage chips is given.

In an embodiment, the first check data is check data obtained by encoding the user data based on a first encoding scheme and an m-order primitive polynomial, and m is an integer greater than 0.

In an embodiment, a value of a is an integer greater than 1 and less than or equal to $2^m-2$.

In an embodiment, a quantity of bits stored in each of the first storage chips, a quantity of bits stored in each of the second storage chips, and a quantity of bits stored in each of the third storage chips are the same, a value is m+1, m+2, or m+k, and k is an integer greater than 2.

In an embodiment, the first check data is cyclic redundancy check CRC check data.

In an embodiment, the second check data is parity check data.

In an embodiment, when checking the user data based on the first check data and the second check data, the computer device encodes the user data based on the m-order primitive polynomial, to obtain third check data, and encodes the user data and the third check data to obtain fourth check data. Then, the computer device checks the user data based on the first check data, the second check data, the third check data, and the fourth check data.

Based on the foregoing technical solution, after obtaining the first data and the second data from the plurality of storage chips respectively through reading, the computer device may obtain, based on the first data and the second data, the locally generated third check data and the locally generated fourth check data that are used for data check, and check the user data based on the third check data, the fourth check data, and the first check data and the second check data that are obtained through reading, to determine a data status of the user data.

In an embodiment, the data status of the user data may include that there is an uncorrectable error, there is a correctable error, there is no error, or the like.

In an embodiment, when checking the user data based on the first check data, the second check data, the third check data, and the fourth check data, when the first check data is the same as the third check data and a difference between the second check data and the fourth check data is the m-order primitive polynomial, the computer device determines that a data status of the first data is that there is an uncorrectable error.

Based on the foregoing technical solution, the first check data and the second check data are generated based on the m-order primitive polynomial. Correspondingly, if the first check data is the same as the third check data and the difference between the second check data and the fourth check data is the m-order primitive polynomial, it indicates that there is an error in the user data obtained through reading and the error is an uncorrectable error, so that the computer device determines that the data status of the first data is that there is the uncorrectable error.

In an embodiment, checking the user data based on the first check data, the second check data, the third check data, and the fourth check data includes:

When the first check data is the same as the third check data and a difference between the second check data and the fourth check data is not 0 and is not the m-order primitive polynomial, the computer device determines that a data status of the first data is that there is no error.

When the first check data is the same as the third check data and the second check data is the same as the fourth check data, the computer device determines that a data status of the first data is that there is no error.

When the first check data is different from the third check data and the second check data is the same as the fourth check data, the computer device determines that a data status of the first data is that there is an uncorrectable error.

Alternatively, when the first check data is different from the third check data and the second check data is different from the fourth check data, the computer device determines that a data status of the first data is that there is a correctable error, and corrects the first data based on the first check data, the second check data, the third check data, and the fourth check data.

Based on the foregoing technical solution, the computer device may further check the read check data (including the first check data and the second check data) based on the locally generated check data (including the third check data and the fourth check data), and determine different data statuses of the read user data in different check results.

A third aspect of embodiments of this application provides a data processing apparatus. The apparatus may be a computer device, or the apparatus may be a component (for example, a processor, a chip, or a chip system) in the computer device. The apparatus includes a processing unit and an interface unit.

The processing unit is configured to obtain user data, where the user data includes first data and second data.

The interface unit is configured to write the first data into a first storage chips, where a is an integer greater than 0.

The interface unit is further configured to write the second data and first check data into b second storage chips, where the first check data includes check data for the user data, and b is an integer greater than 0.

The interface unit is further configured to write second check data into c third storage chips, where the second check data includes check data for both the user data and the first check data, and c is an integer greater than 0.

Based on the foregoing technical solution, after the processing unit in the data processing apparatus obtains the user data that needs to be stored and that includes the first data and the second data, in a process in which the interface unit in the data processing apparatus writes the user data into storage chips in a storage medium, the interface unit separately stores the first data in the a first storage chips, and stores the second data in the b second storage chips different from the first storage chips. The interface unit further writes the first check data into the b second storage chips, where the first check data includes the check data for the user data. In other words, the interface unit places the second data in the user data and the first check data for the user data into the second storage chips, so that a part of data in the user data and a part of data in the check data share a same storage chip. Compared with a current design in which the user data can be stored only in a part of storage chips, in a design manner of reusing storage space corresponding to the second storage chip, a case in which a large amount of user data can be stored only by discarding a part of the user data or by setting an additional storage chip is avoided, to store more user data in a limited quantity of storage chips, optimize a data storage manner, and improve storage space utilization of a storage medium.

In an embodiment, the second data is metadata, and the metadata includes descriptive metadata, structured metadata, administrative metadata, reference metadata, statistical metadata, or legal metadata.

In an embodiment, a quantity of bits corresponding to the first data in each of the a first storage chips, a quantity of bits corresponding to the second data and the first check data in each of the b second storage chips, and a quantity of bits corresponding to the second check data in each of the c third storage chips are the same.

In an embodiment, a storage space size of each of the a first storage chips, a storage space size of each of the b second storage chips, and a storage space size of each of the c third storage chips are the same.

In an embodiment, the first check data includes a plurality of pieces of bit information, and each of the plurality of pieces of bit information in the first check data is check data for the user data.

In an embodiment, the second check data includes a plurality of pieces of bit information, first bit information in the plurality of pieces of bit information in the second check data is check data for both the user data and the first check data, and second bit information in the plurality of pieces of bit information in the second check data is check data for both the first data and the first check data.

In an embodiment, a quantity of bits in the first bit information is equal to a quantity of bits of the second data.

In an embodiment, both a value of b and a value of c are 1.

In an embodiment, the value of b is greater than 1. Each of the b storage chips includes a part of data in the second data and a part of data in the first check data.

In an embodiment, the first check data is check data obtained by encoding the user data based on a first encoding scheme and an m-order primitive polynomial, and m is an integer greater than 0.

In an embodiment, a value of a is an integer greater than 1 and less than or equal to $2^m-2$.

In an embodiment, a quantity of bits stored in each of the first storage chips, a quantity of bits stored in each of the second storage chips, and a quantity of bits stored in each of the third storage chips are the same, a value is m+1, m+2, or m+k, and k is an integer greater than 2.

In an embodiment, the first check data is CRC check data.

In an embodiment, the second check data is parity check data.

A fourth aspect of embodiments of this application provides a data processing apparatus. The apparatus may be a computer device, or the apparatus may be a component (for example, a processor, a chip, or a chip system) in the computer device. The apparatus includes a processing unit and an interface unit.

The interface unit is configured to read first data from a first storage chips, where the first data is included in user data, the user data further includes second data, and a is an integer greater than 0.

The interface unit is further configured to read the second data and first check data from b second storage chips, where the first check data includes check data for the user data, and b is an integer greater than 0.

The interface unit is further configured to read second check data from c third storage chips, where the second check data includes check data for both the user data and the first check data, and c is an integer greater than 0.

The processing unit is configured to check the user data based on the first check data and the second check data.

Based on the foregoing technical solution, in a process in which the interface unit in the data processing device reads the user data from storage chips in a storage medium, the interface unit separately reads the first data from the a first storage chips, and reads the second data from the b second storage chips. The computer device further reads the first check data from the b second storage chips. In other words, the second data in the user data and the first check data for the user data are read from the second storage chips, so that a part of data in the user data and a part of data in the check data are read from a same storage chip. Compared with a current design in which the user data can be stored only in a part of storage chips, in a design manner of reusing storage space corresponding to the second storage chip, a case in which a large amount of user data can be stored only by discarding a part of the user data or by setting an additional storage chip is avoided, to store more user data in a limited quantity of storage chips, optimize a data storage manner, and improve storage space utilization of a storage medium.

In an embodiment, the second data is metadata, and the metadata includes descriptive metadata, structured metadata, administrative metadata, reference metadata, statistical metadata, or legal metadata.

In an embodiment, a quantity of bits corresponding to the first data in each of the a first storage chips, a quantity of bits corresponding to the second data and the first check data in each of the b second storage chips, and a quantity of bits corresponding to the second check data in each of the c third storage chips are the same.

In an embodiment, a storage space size of each of the a first storage chips, a storage space size of each of the b second storage chips, and a storage space size of each of the c third storage chips are the same.

In an embodiment, the first check data includes a plurality of pieces of bit information, and each of the plurality of pieces of bit information in the first check data is check data for the user data.

In an embodiment, the second check data includes a plurality of pieces of bit information, first bit information in the plurality of pieces of bit information in the second check data is check data for both the user data and the first check data, and second bit information in the plurality of pieces of bit information in the second check data is check data for both the first data and the first check data.

In an embodiment, a quantity of bits in the first bit information is equal to a quantity of bits of the second data.

In an embodiment, both a value of b and a value of c are 1.

In an embodiment, the value of b is greater than 1. Each of the b storage chips includes a part of data in the second data and a part of data in the first check data.

In an embodiment, the first check data is check data obtained by encoding the user data based on a first encoding scheme and an m-order primitive polynomial, and m is an integer greater than 0.

In an embodiment, a value of a is an integer greater than 1 and less than or equal to $2^m-2$.

In an embodiment, a quantity of bits stored in each of the first storage chips, a quantity of bits stored in each of the second storage chips, and a quantity of bits stored in each of the third storage chips are the same, a value is m+1, m+2, or m+k, and k is an integer greater than 2.

In an embodiment, the first check data is cyclic redundancy check CRC check data.

In an embodiment, the second check data is parity check data.

In an embodiment, the processing unit is configured to:
encode the user data based on the m-order primitive polynomial, to obtain third check data;
encode the user data and the third check data to obtain fourth check data; and
check the user data based on the first check data, the second check data, the third check data, and the fourth check data.

In an embodiment, the processing unit is configured to:
when the first check data is the same as the third check data and a difference between the second check data and the fourth check data is the m-order primitive polynomial, determine that a data status of the first data is that there is an uncorrectable error.

In an embodiment, the processing unit is configured to:
when the first check data is the same as the third check data and a difference between the second check data and the fourth check data is not 0 and is not the in-order primitive polynomial, determine that a data status of the first data is that there is no error;
when the first check data is the same as the third check data and the second check data is the same as the fourth check data, determine that a data status of the first data is that there is no error;
when the first check data is different from the third check data and the second check data is the same as the fourth check data, determine that a data status of the first data is that there is an uncorrectable error; or
when the first check data is different from the third check data and the second check data is different from the fourth check data, determine that a data status of the first data is that there is a correctable error, and correct the first data based on the first check data, the second check data, the third check data, and the fourth check data.

A fifth aspect of embodiments of this application provides a communication apparatus, including at least one processor. The at least one processor is coupled to a memory. The memory is configured to store a program or instructions. The at least one processor is configured to execute the program or the instructions, so that the apparatus implements the method according to any one of the first aspect or the possible implementations of the first aspect, or the apparatus implements the method according to any one of the second aspect or the possible embodiments of the second aspect.

A sixth aspect of embodiments of this application provides a computer-readable storage medium storing one or more computer-executable instructions. When the computer-executable instructions are executed by a processor, the processor performs the method according to any one of the first aspect or the possible implementations of the first aspect, or the processor performs the method according to any one of the second aspect or the possible embodiments of the second aspect.

A seventh aspect of embodiments of this application provides a computer program product (also referred to as a computer program) storing one or more computers. When the computer program product is executed by a processor, the processor performs the method according to any one of the first aspect or the possible implementations of the first aspect, or the processor performs the method according to any one of the second aspect or the possible embodiments of the second aspect.

An eighth aspect of embodiments of this application provides a chip system. The chip system includes at least one processor, configured to support a communication apparatus in implementing functions according to any one of the first aspect or the possible implementations of the first aspect, or configured to support a communication apparatus in implementing functions according to any one of the second aspect or the possible embodiments of the second aspect.

In an embodiment, the chip system further includes a memory. The memory is configured to store program instructions and data that are necessary for the communication apparatus. The chip system may include a chip, or include a chip and another discrete device. Optionally, the chip system further includes an interface circuit, and the interface circuit provides program instructions and/or data for the at least one processor.

A ninth aspect of embodiments of this application provides a data storage system. The data storage system includes the data processing apparatus in the third aspect and the data processing apparatus in the fourth aspect, and/or the communication system includes the data processing apparatus in the fifth aspect.

For technical effects brought by any design in the fifth aspect to the ninth aspect, refer to the technical effects brought by different embodiments in the first aspect and the second aspect. Details are not described herein again.

It can be learned from the foregoing technical solutions that in the process in which the computer device reads the user data from the storage chips in the storage medium, the computer device separately reads the first data from the a first storage chips, and reads the second data from the b second storage chips. The computer device further reads the first check data from the b second storage chips. In other words, the second data in the user data and the first check data for the user data are read from the second storage chips, so that the part of data in the user data and the part of data in the check data are read from the same storage chip. Compared with the current design in which the user data can be stored only in the part of storage chips, in the design manner of reusing storage space corresponding to the second storage chip, a case in which the large amount of user data can be stored only by discarding the part of the user data or by setting the additional storage chip is avoided, to store more user data in the limited quantity of storage chips, optimize the data storage manner, and improve storage space utilization of the storage medium.

DESCRIPTION OF EMBODIMENTS

Figure 1:
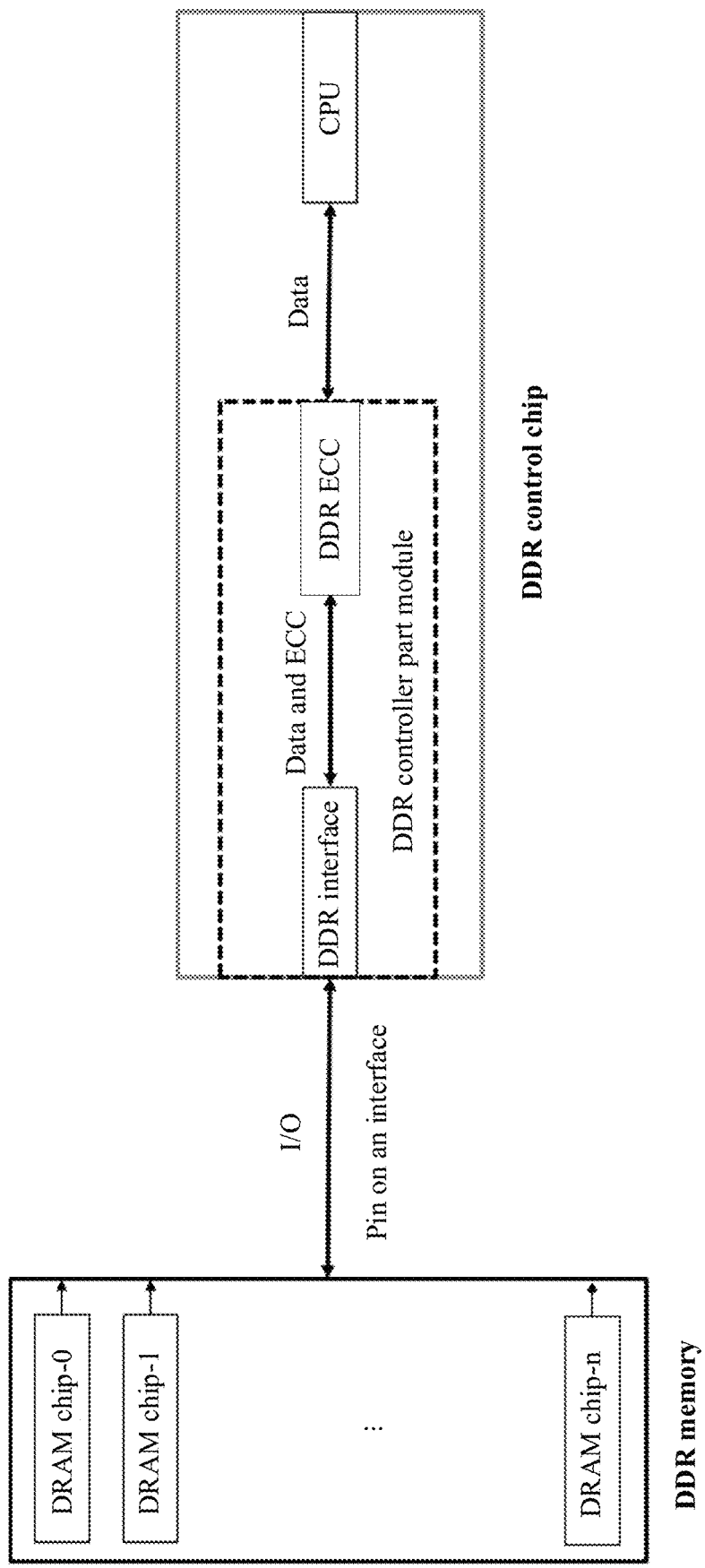
FIG. 1 is a schematic diagram of DDR hardware according to this application.

In this application, unless otherwise specified, for same or similar parts of embodiments, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method based on an internal logical relationship thereof. The following descriptions are implementations of this application, but are not intended to limit the protection scope of this application.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the apparatus provided in embodiments of this application may also correspondingly implement these features or functions. Details are not described herein.

In descriptions of this application, unless otherwise specified, "a plurality of" means two or more than two. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

In addition, to clearly describe the technical solutions in embodiments of this application, terms such as "first" and "second" are used in embodiments of this application to distinguish between same items or similar items that provide basically same functions or purposes. Persons skilled in the art may understand that the terms such as "first" and "second" do not limit a quantity or an execution sequence, and the terms such as "first" and "second" do not indicate a definite difference. In addition, in embodiments of this application, the term such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the term such as "example" or "for example" is intended to present a relative concept in a specific manner for ease of understanding.

First, some terms in embodiments of this application are explained and described, to facilitate understanding of persons skilled in the art.

1. Metadata (or denoted as Meta-Data), also referred to as interpretation data, mediation data, relay data, post-set data, or the like, is data that describes other data. Metadata includes six different types, which are respectively descriptive metadata, structured metadata, administrative metadata, reference metadata, statistical metadata, and legal metadata.

a. The descriptive metadata describes a resource used to discover and identify a meaning, and may include elements such as a title, an abstract, an author, and a keyword.
   b. The structured metadata is metadata about a data container and indicates how to collate a compound object, for example, a manner in which pages are arranged to form a chapter.
   c. The administrative metadata is information used to manage a resource, for example, time and a manner for generating data, a file type, and other technical information, and a person that has permission to access the data.
   d. The reference metadata is information related to content and statistical data quality.
   e. The statistical metadata is also referred to as processing procedure data, and describes a procedure of collecting, processing, or generating data.
   f. The legal metadata provides information such as an author, a copyright holder, and a public authorization term.

2. Random error: is an error pattern. A random error occurs in an entire data block and check bits.

3. Chip-kill: is an error pattern. A dynamic random access memory (DRAM) chip-kill causes an error in an entire data block and a corresponding column in check bits.

As shown in Table 1, an example in which data bits include T columns (column 1 to column T) and each column includes 4-bit metadata; and check bits include two columns (column T+1 and column T+2) and each column includes 4-bit metadata is used to describe the random error and the chip-kill.

For example, if two random errors occur, it indicates that two bit random errors occur in all bits (data blocks and check bits) in Table 1.

For another example, if one chip-kill occurs, it indicates that an error is concentrated in one column of Table 1 (where an error may occur in one or more bits in any column of the data block or the check bits).

TABLE 1

| Data bit | | | | | Check bit | |
|---|---|---|---|---|---|---|
| A(1, 1) | A(2, 1) | ... | A(T − 1, 1) | A(T, 1) | A(T + 1, 1) | A(T + 2, 1) |
| A(1, 2) | A(2, 2) | | A(T − 1, 2) | A(T, 2) | A(T + 1, 2) | A(T + 2, 2) |
| A(1, 3) | A(2, 3) | | A(T − 1, 3) | A(T, 3) | A(T + 1, 3) | A(T + 2, 3) |
| A(1, 4) | A(2, 4) | | A(T − 1, 4) | A(T, 4) | A(T + 1, 4) | A(T + 2, 4) |

4. Error pattern: is a model developed based on memory error distribution. For example, the random error and the chip-kill are different error distribution models, and therefore are two different error patterns.

5. Cyclic redundancy check (CRC) algorithm: is an error detection algorithm based on a finite field GF(2). The algorithm is used to calculate a CRC-n check code.

6. CRC-n: An n-order generator polynomial g(x) (where the highest power is n) is given, a group of n-bit binary data is obtained according to the CRC algorithm based on target data, and the group of n-bit binary data is the CRC-n check code.

7. CRC-16: A 16-order generator polynomial g(x) is given, and a 16-bit check code is generated according to the CRC algorithm based on target data.
8. CRC-15: A 15-order generator polynomial g(x) is given, and a 15-bit check code is generated according to the CRC algorithm based on target data.
9. Parity check algorithm: is an error detection algorithm based on a finite field GF(2). The algorithm is used to sum up target data to obtain a one-bit check code.
10. Primitive polynomial: In a field theory of mathematics, a primitive polynomial is a smallest polynomial (field theory) of primitive elements with finite expansion of a finite field $GF(p^m)$.
11. Error correction: User data received by a decoding apparatus has an error, and after decoding, the decoding apparatus may feed back an indication indicating that the user data is successfully corrected to original error-free data.
12. Error detection: After decoding is completed, the decoding apparatus cannot correct data but can detect a data error. Therefore, the decoding apparatus may feed back an indication indicating that the received data has an error, and a system is not allowed to transmit the error data to a user.
13. Wrong correction: After decoding is completed, if corrected data has an error, the decoding apparatus still feeds back an indication indicating that data is successfully corrected to original error-free data. This causes flooding of error data.
14. No wrong correction: This is equivalent to error detection and only emphasizes that an error can be detected and therefore wrong correction does not occur.

For ease of understanding the method provided in embodiments of this application, the following describes a system architecture of the method provided in embodiments of this application. It may be understood that the system architecture described in embodiments of this application is intended to describe the technical solutions in embodiments of this application more clearly, and do not constitute any limitation on the technical solutions provided in embodiments of this application.

With development of science and technologies, storage technologies used to store data are also continuously updated. Common data storage technologies include video memory storage, cache storage, memory storage, running memory storage, flash memory storage, and the like. Usually, a physical storage component unit used to store data may be referred to as a storage chip. A process of inputting data into the storage chip may be referred to as writing, and a process of outputting data from the storage chip may be referred to as reading.

Currently, to avoid a data error caused by chip-kill, data tampering, or the like, check data (the check bits shown in Table 1) may be introduced in a data storage process, and the check data is used for data error detection, data error correction, and the like. With reference to the accompanying drawings, the following uses a process of writing data and reading data in a double data rate synchronous dynamic random access memory (DDR SDRAM, DDR for short) in a memory storage technology as an example for description.

It should be noted that, in the following example shown in FIG. 1, an example in which check data is an error correction code (CRC) is used as an example. Clearly, the check data may alternatively be other data, for example, other check data such as an error detection code or an erasure code, and is merely described as an example herein.

FIG. 1 is a schematic diagram of DDR hardware. The DDR hardware mainly includes a DDR memory and a DDR control chip. The DDR hardware shown in FIG. 1 may be any product that uses a multi-chip DRAM as a main memory, and includes but is not limited to a general-purpose computer memory module, a computing server, a storage server, and the like.

As shown in FIG. 1, the DDR memory includes n (where n is a positive integer) DRAM (storage) chips, and each DRAM chip in the DDR memory may be connected to the DDR control chip through an input/output (I/O) interface. Specifically, the I/O may be a pin on an interface. The DDR control chip may include a DDR controller part module and a central processing unit (CPU), and the DDR controller part module includes a DDR interface module and a DDR ECC module.

In a process of writing data into the DDR memory, the CPU first obtains to-be-written user data, then the CPU transmits the data to the DDR ECC module in the DDR controller part module, and the DDR ECC module processes the data to obtain user data and check data (Data and ECC). Then, the DDR ECC module separately writes, on the I/O through the DDR interface module in the DDR controller part module, the data and ECC into the n DRAM chips included in the DDR memory.

In a process of reading data from the DDR memory, the DDR interface module in the DDR controller part module separately reads, on the I/O, data and ECC from the n DRAM chips included in the DDR memory, and the DDR ECC module in the DDR controller part module performs error correction on the data, to obtain corrected data. Then, the corrected data is output to the CPU, and the CPU performs subsequent processing on the data.

The processes of writing the data and reading the data shown in FIG. 1 are used as an example. During current actual application, researchers find that a problem of a memory (for example, the DDR memory shown in FIG. 1) including a plurality of storage chips ranks first in hardware problems related to the technical field of storage. The problem of the memory including the plurality of storage chips accounts for a large proportion in all problems of a storage controller. After the memory is faulty, an operating system is usually reset abnormally and a severe alarm is generated, causing poor user experience. A single chip-kill accounts for an extremely high proportion in all memory problems. Therefore, improving an error correction capability for the single chip-kill can effectively reduce the foregoing memory problems.

In a current storage manner, a storage medium usually includes a plurality of storage chips (as shown in FIG. 1, the DDR memory includes n chips). In addition, storage space corresponding to a part of the storage chips is used to store user data, and storage space corresponding to the other part of the storage chips is used to store check data. With reference to an example shown in FIG. 2, the following describes an error correction method that is currently commonly used in the industry.

Figure 2:
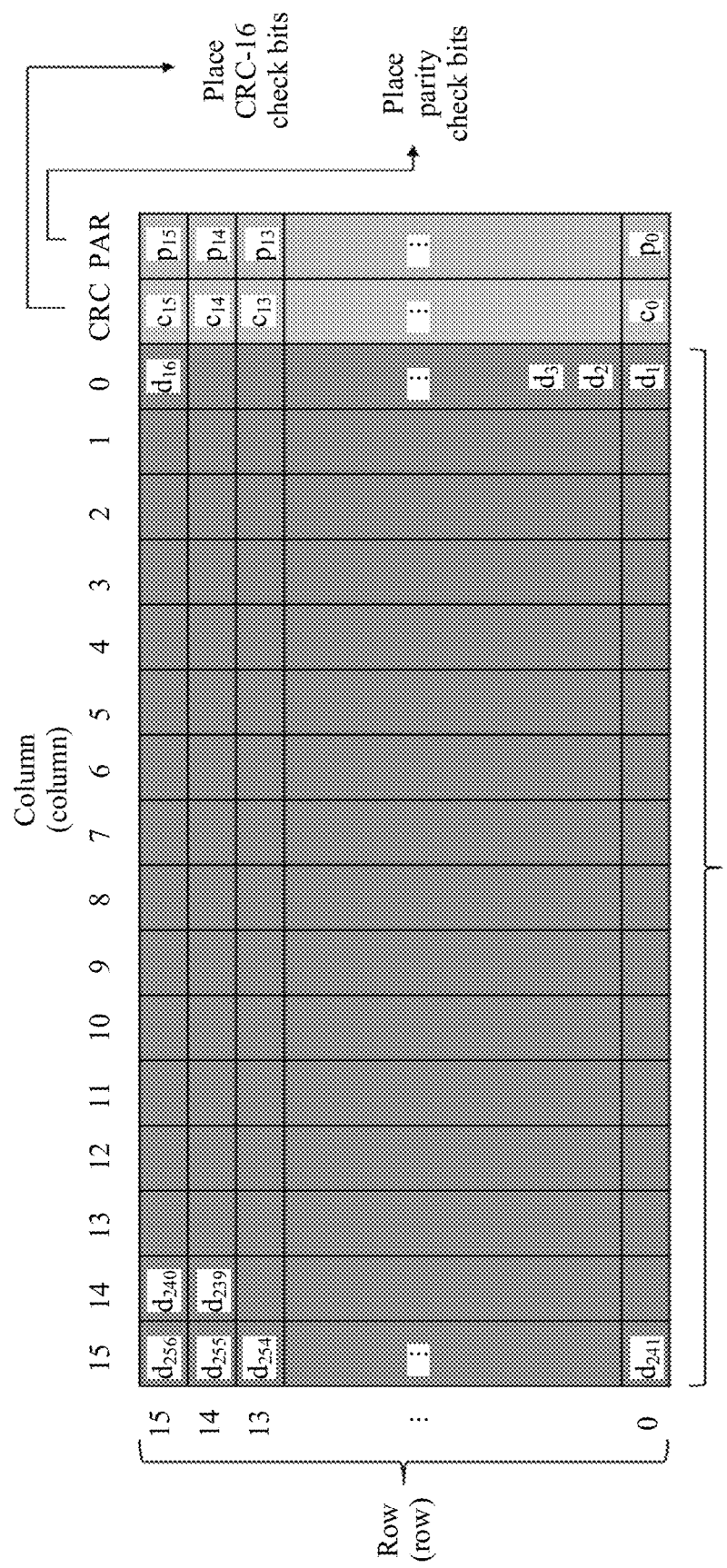
FIG. 2 is a schematic diagram of a codeword architecture according to this application.

As shown in FIG. 2, an example in which a specification of a DDR memory is a commonly used configuration (a 16+2 chip configuration for short) of user data of 16 storage chips and check data of two storage chips in the industry is used.

In data storage grids shown in FIG. 2, each column represents storage space of one storage chip. 16 storage chips numbered 0 to 15 are used to store user data, and two storage chips numbered "CRC" and "PAR" are used to store check data, and respectively refer to a CRC check code and a parity check code in the check data. In addition, in the data storage grids shown in FIG. 2, each row represents data of all storage chips in the row. In the example shown in FIG. 2, sizes of storage space included in all storage chips are equal.

As shown in FIG. 2, a commonly used error correction code is CRC-16 check and parity check. An error correction code codeword architecture of this configuration is to place and combine 16 bits of each chip based on a chip sequence. The error correction code codeword architecture is that shown in FIG. 2. 16 bits of an $i^{th}$ column (Column-i) are 16 bits read from an $it^h$ storage chip. Therefore, a code length of an error correction code codeword based on CRC-16 check and parity check is 16*(16+2)=288 bits. The current CRC-16 check and parity check can correct one chip-kill at a 100% probability and detect two random errors at the 100% probability.

Specifically, in an encoding process, user data is data obtained by an encoder before encoding, and encoding steps of CRC-16 check and parity check are as follows:

Encoding step 1: Calculate CRC-16 check bits: a 16-order generator polynomial g(x) is given, and the CRC-16 check bits C(x) is calculated according to a CRC algorithm based on the user data (corresponding to column-0 to column-15 in FIG. 2).

Encoding step 2: Calculate parity check bits: a row-j parity check bit $p_j$ of column-PAR is calculated by using a parity check algorithm based on all user data and data in a $j^{th}$ row (Row-j) of the CRC-16 check bits (corresponding to column-0 to column-15 and column-CRC in FIG. 2), where j=0, 1, . . . , 15. In this case, $P(x)=p_{15}x^{15}+ \ldots +p_1x+p_0$.

The two steps are performed to implement a process of encoding the user data and obtaining the check data. Then, the user data and the check data may be stored in the storage manner shown in FIG. 2, so that a decoder subsequently obtains related data and performs decoding.

Specifically, before the decoder performs decoding, the decoder obtains, in the storage manner shown in FIG. 2, that user data is $d_1', \ldots, d_{256}'$, CRC-16 check bits are $c_0', \ldots, c_{14}'$, and received parity check bits are $p_0', \ldots, p_{15}'$. Set $D'(x)=x^{16}[d_{256}'x^{255}+d_{255}'x^{254}+ \ldots +d_2'x+d_1']$, $C'(x)=c_{15}'x^{15}+c_{14}'x^{14}+ \ldots +c_1'x+c_0'$, and $P'(x)=p_{15}'x^{15}+ \ldots +p_1'x+p_0'$. In the decoder, decoding steps of CRC-16 check and parity check are as follows:

Decoding step 1: Re-calculate CRC-16 check bits: re-calculate the CRC-16 check bits C"(x) by using an encoding generator polynomial g(x) based on user data received by the decoder.

Decoding step 2: Re-calculate parity check bits: re-calculate a parity check bit $p"_j$ by summing up row-j and based on the user data and the CRC-16 check bits that are received by the decoder, where j=0, 1, . . . , 15. In this case, $P"(x)=p"_{15}x^{15}+ \ldots +p"_1x+p"_0$.

Decoding step 3: It is determined based on the decoding step 1 and the decoding step 2:

a. If C"(x)=C'(x), it is determined that the user data is correct.

b. If C"(x)≠C'(x) and P"(x)=P'(x), it is determined that correction cannot be performed.

c. If C"(x)≠C'(x) and P"(x)≠P'(x), received column-i data, where i=0, 1, . . . , 15, and CRC are separately corrected according to P"(x)−P'(x). That is, for each i, row-j of column-i is corrected based on each coefficient of P"(x)−P'(x), where j=0, 1, . . . , 15. Then, a modulo operation is performed by using the encoding generator polynomial g(x) based on corrected column-i data, received column-k data (where k=0, 1, . . . , 15, CRC and k≠i), and the received CRC-16 check bits, to obtain a new remainder $C"_i(x)$. If there is one and only one A that enables $C"_A(x)=C'(x)$, entire data (where the entire data includes corrected column-A data, the received column-k data (where k=0, 1, . . . , 15, CRC and k A), the received CRC-16 check bits, and the received parity check bits) obtained by correcting column-A is returned; and in another case, it is reported that an error cannot be corrected.

The following provides a chip-kill instance to describe the foregoing encoding steps and decoding steps by using an example.

In the encoding process, it is set that correct data is the user data $d_1= \ldots =d_{256}=1$, the CRC-16 check bits $c_0, \ldots, c_{15}$, and the parity check bits $p_0, \ldots, p_{15}$ in FIG. 2, and $D(x)=x^{16}(d_{256}x^{255}+d_{255}x^{254}+ \ldots +d_3x^2+d_2x+d_1)=x^{16}(x^{255}+x^{254}+ \ldots +x^2+x+1)$. $g(x)=x^{16}+x^{12}+x^3+x+1$ is given. In this case, the following formulas may be obtained based on an encoding scheme.

$$D(x) \bmod g(x) = C(x) = c_{15}x^{15}+c_{14}x^{14}+ \ldots +c_1x+c_0 = x^{15}+x^{14}+x^{13}+x^2+x. \quad \text{Formula 1:}$$

$$p_{15}=p_{14}=p_{13}=p_2=p_1=1, \text{ and}$$
$$p_{12}=p_{11}=p_{10}=p_9=p_8=p_7=p_6=p_5=p_4=p_3=p_0=0.$$
$$\text{Set } P(x)=p_{15}x^{15}+p_{14}x^{14}+ \ldots +p_1x+p_0=x^{15}+x^{14}+x^{13}+x^2+1. \quad \text{Formula 2:}$$

In the decoding process, it is assumed that one chip-kill occurs in column-9 of error data received by the decoder. It is assumed that an error occurs in $d_{129}=d_{130}=0$, that is, an error occurs in bits corresponding to row-0 and row-1 in column-9. This error pattern is set to e(x)=x+1. In this case, received user data is $D'(x)=D(x)+x^{16 \times 9}e(x)$, received CRC-16 check bits C'(x)=C(x), and received parity check bits P'(x)=P(x). It may be obtained as follows based on a decoding scheme.

Decoding step 1: Calculate $D'(x) \bmod g(x)=C"(x)=x^8+x^6+x^3+x^2$.

Decoding step 2: Calculate $p"_{15}=p"_{14}=p"_{13}=p"_2=p"_0=1$, $p"_{12}=p"_{11}=p"_{10}=p"_9=p"_8=p"_7=p"_6=p"_5=p"_4=p"_3=p"_1=0$, and set $P"(x)=p"_{15}x^{15}+p_{14}x^{14}+ \ldots +p"_1x+p"_0=x^{15}+x^{14}+x^{13}+x^2+1$.

Based on the decoding step 1 and the decoding step 2, because C"(x)≠C(x) and P"(x)≠P(x), enter step 3.c, and need to perform a modulo operation of g(x) on column-i data after the column-i data is corrected according to P"(x)−P(x)=x+1=e(x), that is, calculate $[D'(x)+x^{16i}(x+1)] \bmod g(x)=[D'(x)+x^{16i}e(x)] \bmod g(x)=C"_i(x)$, where i=0, 1, . . . , 16. For example, when i=10, $[D'(x)+x^{160}e(x)] \bmod g(x)=[D(x)+x^{144}e(x)+x^{160}e(x)] \bmod g(x)=C"_{10}(x)\neq C(x)$ is calculated. As a result, when i=10, an error cannot be corrected. Finally, it can be learned that $C"_9(x)=C(x)$ may be enabled only when i=9. Then, entire data obtained by correcting column-9 is returned.

Therefore, based on the foregoing encoding and decoding instance, when one chip-kill occurs or two random errors occur, in the decoding process, the decoding step 3.c is definitely performed. Two cases are as follows:

Case 1: For one chip-kill, i can be found to enable $C"_i(x)=C(x)$. Therefore, an error can be corrected, and then a corrected value can be reported to a system. Therefore, the error can be corrected with 100%.

Case 2: For two random errors, i cannot be found to enable $C"_i(x)=C(x)$. Therefore, an error cannot be corrected. That is, a message indicating that data cannot be corrected is reported to a system. The report indicates that the system learns that the data has an error and the error cannot be corrected. Therefore, the error can be detected with 100% but cannot be corrected.

However, in the error correction process shown in FIG. 2, in the foregoing design in which the user data can be stored only in a part of the storage chips, if more user data is intended to be stored, storage space of the part of the storage chips may be insufficient. In this case, a large amount of user data can be stored only by discarding a part of the user data or by setting an additional storage chip.

Therefore, how to optimize a storage medium to store more user data in a limited quantity of storage chips is an urgent technical problem that needs to be resolved.

In view of this, this application provides a data processing method and apparatus, to store more user data in a limited quantity of storage chips in a design manner of reusing storage space corresponding to a second storage chip, optimize a data storage manner, and improve storage space utilization of a storage medium.

Figure 3:
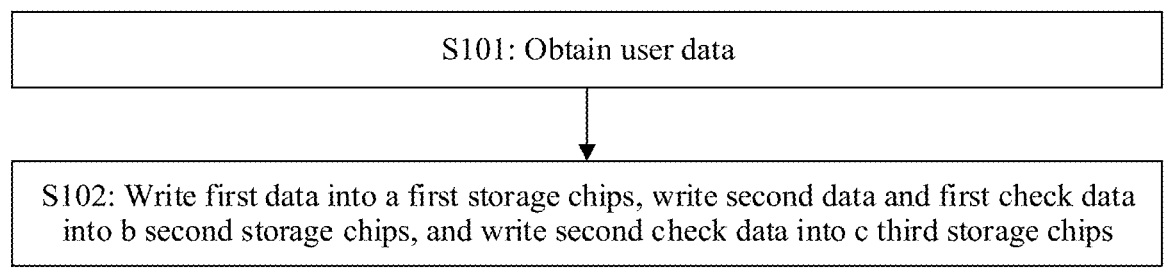
FIG. 3 is a schematic diagram of a data processing method according to this application.

FIG. 3 is a schematic diagram of a data processing method according to an embodiment of this application. The method includes the following operations. The method shown in FIG. 3 is mainly used in a process of writing data into a plurality of storage chips. The method is performed by a computer device, or the method is performed by a component (for example, a processor, a chip, or a chip system) in the computer device.

In operation S101, user data is obtained.

In this embodiment, the computer device obtains the user data in step S101, where the user data includes first data and second data.

In operation S201, the first data is written into a first storage chips, write the second data and first check data into b second storage chips, and write second check data into c third storage chips.

In an embodiment, after the computer device obtains the user data in operation S101, in operation S102, the device writes the first data into the a first storage chips, where a is an integer greater than 0. The device writes the second data and the first check data into the b second storage chips, where the first check data includes check data for the user data, and b is an integer greater than 0. In addition, the device writes the second check data into the c third storage chips, where the second check data includes check data for both the user data and the first check data, and c is an integer greater than 0.

Based on the technical solution shown in FIG. 3, after the computer device obtains the user data that needs to be stored and that includes the first data and the second data in operation S101, in a process in which the computer device writes the user data into storage chips in a storage medium in operation S102, the computer device separately stores the first data in the a first storage chips, and stores the second data in the b second storage chips different from the first storage chips. The device further writes the first check data into the b second storage chips, where the first check data includes the check data for the user data. In other words, the computer device places the second data in the user data and the first check data for the user data into the second storage chips, so that a part of data in the user data and a part of data in the check data share a same storage chip. Compared with a current design in which the user data can be stored only in a part of storage chips, in a design manner of reusing storage space corresponding to the second storage chip, a case in which a large amount of user data can be stored only by discarding a part of the user data or by setting an additional storage chip is avoided, to store more user data in a limited quantity of storage chips, optimize a data storage manner, and improve storage space utilization of a storage medium.

Figure 4:
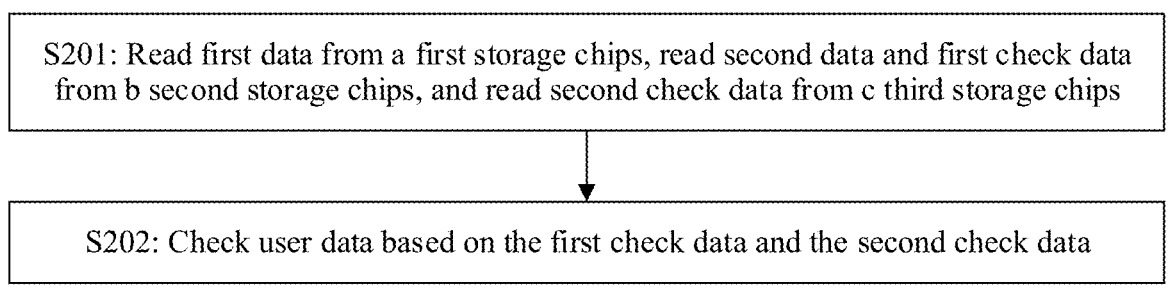
FIG. 4 is another schematic diagram of a data processing method according to this application.

FIG. 4 is a schematic diagram of a data processing method according to an embodiment of this application. The method includes the following operations. The method shown in FIG. 3 is mainly used in a process of reading data from a plurality of storage chips. The method is performed by a computer device, or the method is performed by a component (for example, a processor, a chip, or a chip system) in the computer device.

In operation 201, first data is read from a first storage chips, read second data and first check data from b second storage chips, and read second check data from c third storage chips.

In this embodiment, in operation S201, the computer device reads the first data from the a first storage chips, where the first data is included in user data, the user data further includes the second data, and a is an integer greater than 0. In addition, the computer device reads the second data and the first check data from the b second storage chips, where the first check data includes check data for the user data, and b is an integer greater than 0. The computer device reads the second check data from the c third storage chips, where the second check data includes check data for both the user data and the first check data, and c is an integer greater than 0.

In operation 202, the user data is checked based on the first check data and the second check data.

In this embodiment, after operation S201, the computer device checks the user data based on the first check data and the second check data that are obtained through reading.

Based on the technical solution shown in FIG. 4, in a process in which the computer device reads the user data from storage chips in a storage medium in operation S201, the computer device separately reads the first data from the a first storage chips, and reads the second data from the b second storage chips. The computer device further reads the first check data from the b second storage chips. In other words, the second data in the user data and the first check data for the user data are read from the second storage chips, so that a part of data in the user data and a part of data in the check data are read from a same storage chip. Compared with a current design in which the user data can be stored only in a part of storage chips, in a design manner of reusing storage space corresponding to the second storage chip, a case in which a large amount of user data can be stored only by discarding a part of the user data or by setting an additional storage chip is avoided, to store more user data in a limited quantity of storage chips, optimize a data storage manner, and improve storage space utilization of a storage medium.

In an embodiment, based on the implementation process shown in FIG. 3 or FIG. 4, the second data is metadata, and the metadata includes descriptive metadata, structured metadata, administrative metadata, reference metadata, statistical metadata, or legal metadata.

Specifically, user data that shares a same storage chip with a part of data in the check data is the second data. The second data may be data associated with the first data. For example, the second data may be metadata. In addition, the second data may be the descriptive metadata, the structured metadata, the administrative metadata, the reference metadata, the statistical metadata, the legal metadata, or metadata of another type. This is not limited herein.

In an embodiment, the second data is not data associated with the first data, or in other words, the second data is not associated with the first data, or in other words, the second data is independent of the first data.

In an embodiment, based on the implementation process shown in FIG. 3 or FIG. 4, a storage space size of each of the a first storage chips, a storage space size of each of the b second storage chips, and a storage space size of each of the c third storage chips are the same.

Specifically, a plurality of storage chips corresponding to the first storage chips, the second storage chips, and the third storage chips that are used to store different data may use same storage space, that is, any one of the plurality of storage chips stores a same quantity of bits. In this way, physical specifications of different storage chips used to store different data are the same, and this facilitates implementation of the solution.

In an embodiment, based on the implementation process shown in FIG. 3 or FIG. 4, a quantity of bits corresponding to the first data in each of the a first storage chips, a quantity of bits corresponding to the second data and the first check data in each of the b second storage chips, and a quantity of bits corresponding to the second check data in each of the c third storage chips are the same.

Based on the foregoing technical solution, in a process in which data is written into a plurality of storage chips, data related to a check process includes: the first data, the second data, the first check data, and the second check data. The quantity of bits corresponding to the first data in each of the a first storage chips, the quantity of bits corresponding to the second data and the first check data in each of the b second storage chips, and the quantity of bits corresponding to the second check data in each of the c third storage chips are the same. Therefore, in the process in which the data is written into the plurality of storage chips, data that is of a same quantity of bits and that is related to the check process is separately written into the plurality of storage chips. This facilitates implementation of the solution. In addition, because each storage chip has data that is related to the check process, each storage chip is checked in a subsequent process of performing check based on the data.

In an embodiment, the quantity of bits corresponding to the first data in each of the a first storage chips, the quantity of bits corresponding to the second data and the first check data in each of the b second storage chips, and the quantity of bits corresponding to the second check data in each of the c third storage chips are different in pairs.

In an embodiment, at least two quantities of bits in the quantity of bits corresponding to the first data in each of the a first storage chips, the quantity of bits corresponding to the second data and the first check data in each of the b second storage chips, and the quantity of bits corresponding to the second check data in each of the c third storage chips are the same.

In an embodiment, based on the implementation process shown in FIG. 3 or FIG. 4, both a value of b and a value of c are 1. Specifically, a value of the quantity b of second storage chips used to store the first check data is 1, and a value of the quantity c of third storage chips used to store the second check data is 1. Compared with an implementation in which the value of b (or c) is greater than 1, a quantity of storage chips used to store check data is minimized, to maximize a quantity of storage chips used to store user data when a total quantity of storage chips is given.

In an embodiment, the value of b is greater than 1. Each of the b storage chips includes a part of data in the second data and a part of data in the first check data.

In an embodiment, based on the implementation process shown in FIG. 3 or FIG. 4, the first check data is cyclic redundancy check CRC check data.

In an embodiment, based on the implementation process shown in FIG. 3 or FIG. 4, the second check data is parity check data.

It should be noted that the first check data and the second check data may alternatively be check data of another type, for example, channel coding (channel coding), hamming code (hamming code), low density parity check code (low density parity check code, LDPC code for short), turbo code (turbo code), or other check data. This is not specifically limited herein.

With reference to implementation examples, the following describes the methods provided in FIG. 3 and FIG. 4 in which more user data is stored in a limited quantity of storage chips, to optimize a data storage manner and improve storage space utilization of a storage medium.

In an implementation example, based on the methods provided in FIG. 3 and FIG. 4, the implementation shown in Table 1 is improved to obtain Table 2.

TABLE 2

| Data bit | | | | | Check bit | |
|---|---|---|---|---|---|---|
| A(1, 1) | A(2, 1) | ... | A(T − 1, 1) | A(T, 1) | X | A(T + 2, 1) |
| A(1, 2) | A(2, 2) | | A(T − 1, 2) | A(T, 2) | A(T + 1, 2) | A(T + 2, 2) |
| A(1, 3) | A(2, 3) | | A(T − 1, 3) | A(T, 3) | A(T + 1, 3) | A(T + 2, 3) |
| A(1, 4) | A(2, 4) | | A(T − 1, 4) | A(T, 4) | A(T + 1, 4) | A(T + 2, 4) |

In the implementation example shown in Table 2, a difference from the implementation in Table 1 lies in that "X" in Table 2 is used to replace "A(T+1, 1)" in Table 1, where "A(T+1, 1)" in Table 1 is used to carry a part of check data, and "X" in Table 2 is used to carry a part of the user data (that is, the second data). In other words, in the implementation example shown in Table 2, the user data is no longer stored in only a part of storage chips, but a part of the user data is carried in a storage chip in which a check bit is located. Therefore, compared with the implementation in Table 1, a large amount of user data can be stored without discarding a part of the user data or by setting an additional storage chip.

Figure 5:
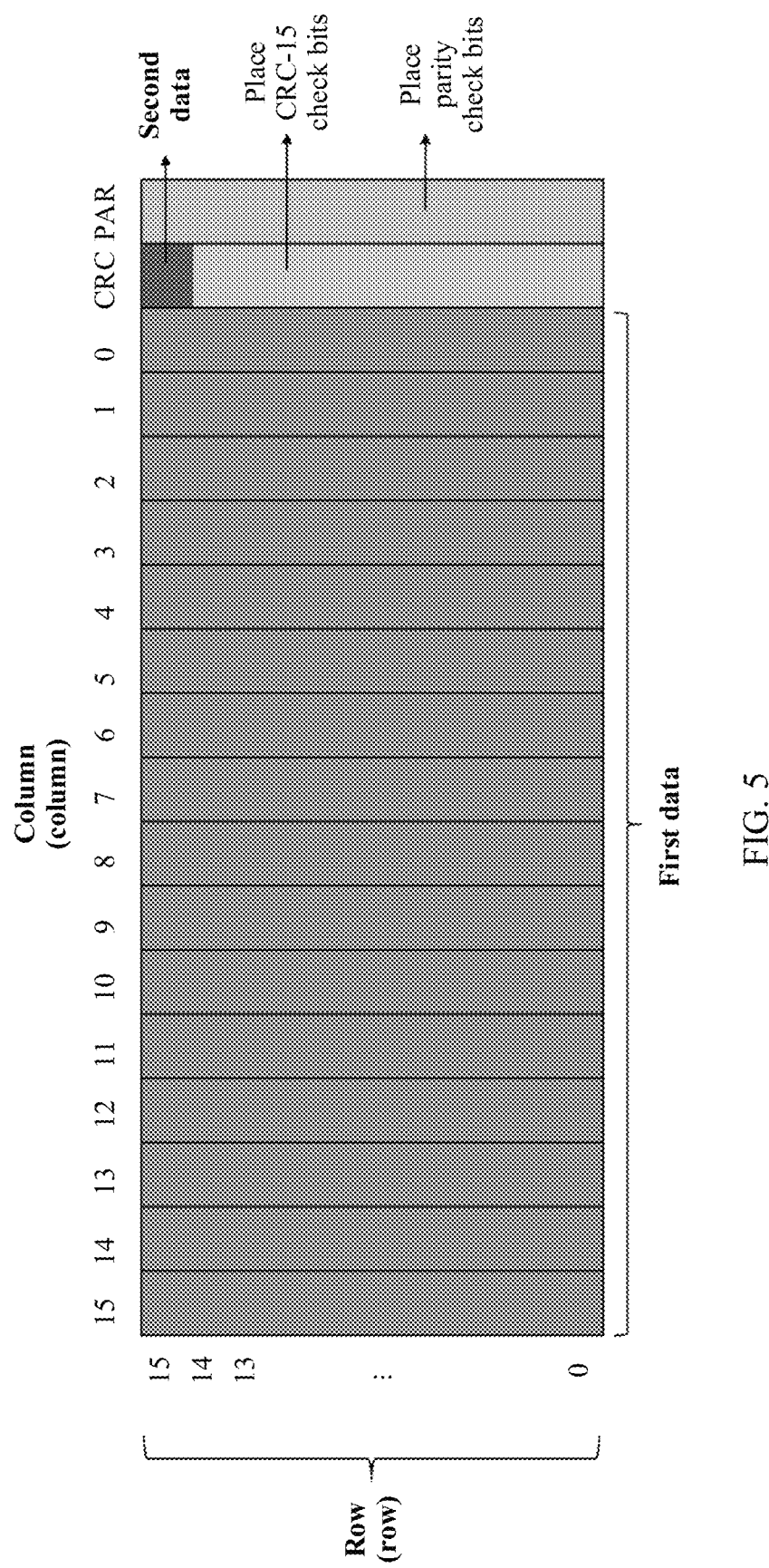
FIG. 5 is another schematic diagram of a codeword architecture according to this application.

In an implementation example, based on the methods provided in FIG. 3 and FIG. 4, the implementation shown in FIG. 2 is improved to obtain FIG. 5.

A difference between an implementation example shown in FIG. 5 and the implementation in FIG. 2 lies in that storage space used to carry the second data in FIG. 5 is a part of the storage space used to carry a part of the CRC data in FIG. 2. In other words, in the implementation example shown in FIG. 5, the user data is no longer stored in only a part of storage chips (storage chips corresponding to a column "0" to a column "15"), but a part of the user data is carried in a storage chip (a storage chip corresponding to a column "CRC") in which a check bit is located. Therefore, compared with the implementation in FIG. 2, a large amount of user data can be stored without discarding a part of the user data or by setting an additional storage chip.

It should be noted that the implementations shown in Table 2 and FIG. 5 are merely examples. During actual application, based on the methods shown in FIG. 3 and FIG. 4, it can be learned that a part of storage space in a storage chip in which the check data is located may be randomly selected to carry a part of data (that is, the second data) in the user data.

Based on the foregoing descriptions, a storage medium including a plurality of storage chips may be improved to store the large amount of user data. However, in this improvement manner, a setting of the current check data may also need to be further improved.

For example, after the codeword architecture in FIG. 2 is improved to obtain the codeword architecture shown in FIG. 5, implementation processes of encoding steps and decoding steps related to FIG. 2 may no longer be applicable. For example, the second data in the foregoing implementation process is one-bit Meta-Data. Both CRC-16 check bits and parity check bits have 16 bits. If one-bit check bit is occupied to place one-bit Meta-Data, it means that one bit in the CRC-16 check bits or the parity check bits needs to be sacrificed. As a result, it cannot be ensured that all one chip-kill errors can be corrected, and it cannot be ensured that all two random errors can be detected. Therefore, error correction and error detection capabilities are reduced. There are even a plurality of error patterns, resulting in wrong correction. The wrong correction affects abnormal reset of an operating system or transfer of error information, causing a severe consequence. Therefore, CRC-16 check and parity check technologies cannot support placement of the one-bit Meta-Data.

To adaptively modify the setting of the check data, the first check data and the second check data in the implementation processes shown in FIG. 3 and FIG. 4 may be further improved.

In an embodiment, based on the implementation process shown in FIG. 3 or FIG. 4, the first check data includes a plurality of pieces of bit information, and each of the plurality of pieces of bit information in the first check data is check data for the user data. Specifically, the first check data includes the check data for the user data. The first check data may include the plurality of pieces of bit information, and each of the plurality of pieces of bit information is the check data for the user data (including the first data and the second data). In this way, the first data and the second data are checked by using each piece of bit information included in the first check data.

In an embodiment, based on the implementation process shown in FIG. 3 or FIG. 4, the second check data includes a plurality of pieces of bit information, first bit information in the plurality of pieces of bit information in the second check data is check data for both the user data and the first check data, and second bit information in the plurality of pieces of bit information in the second check data is check data for both the first data and the first check data. Specifically, the second check data includes the check data for both the user data and the first check data. The second check data may include the plurality of pieces of bit information, at least one piece of bit information (that is, the first bit information) in the plurality of pieces of bit information is the check data for both the user data and the first check data, and at least one piece of bit information (that is, the second bit information) in the plurality of pieces of bit information is the check data for both the first data and the first check data. In other words, a part of data in the second check data is used to check the first data, the second data, and the first check data, and a part of data in the second check data is used to check the first data and the first check data. In this way, different data is checked by using different bit information included in the second check data.

It can be learned from the foregoing implementation that, compared with the implementation process of the encoding steps and the decoding steps shown in FIG. 2 in which a basis for calculating the CRC check code and the parity check code is merely user data stored in the storage space in which the user data is located, in the foregoing implementation process, the first data and the second data are checked by using each piece of bit information included in the first check data, and different data is checked by using different bit information included in the second check data. Therefore, based on the foregoing implementation of improving the storage medium including the plurality of storage chips to store the large amount of user data, the first check data and the second check data are correspondingly improved, so that improved first check data and improved second check data can also implement check on the user data (where the first data in the user data is stored in the first storage chips, and the second data in the user data and a part of check data coexist in the second storage chips).

In an embodiment, based on the implementation process shown in FIG. 3 or FIG. 4, a quantity of bits in the first bit information is equal to a quantity of bits of the second data. Specifically, the first bit information included in the second check data is the check data for both the user data and the first check data. The user data includes the first data and the second data. In other words, the first bit information is used to check at least the second data. Therefore, the first bit information may be used to check the second data by setting the quantity of bits in the first bit information to be the same as the quantity of bits of the second data.

In an embodiment, based on the implementation process shown in FIG. 3 or FIG. 4, the first check data is check data obtained by encoding the user data based on a first encoding scheme and an m-order primitive polynomial, and m is an integer greater than 0.

In an embodiment, based on the implementation process shown in FIG. 3 or FIG. 4, a value of a is an integer greater than 1 and less than or equal to $2^m-2$.

In an embodiment, based on the implementation process shown in FIG. 3 or FIG. 4, a quantity of bits stored in each of the first storage chips, a quantity of bits stored in each of the second storage chips, and a quantity of bits stored in each of the third storage chips are the same, a value is m+1, m+2, or m+k, and k is an integer greater than 2.

The following still uses an example shown in FIG. 2 in which user data of 16 storage chips and check data of two storage chips are configured (a 16+2 chip configuration for short) to describe improvement on the first check data and the second check data.

Specifically, the schematic diagram of the DDR hardware shown in FIG. 1 is used as an example to separately describe improvement on an encoding process and a decoding process.

Figure 6:
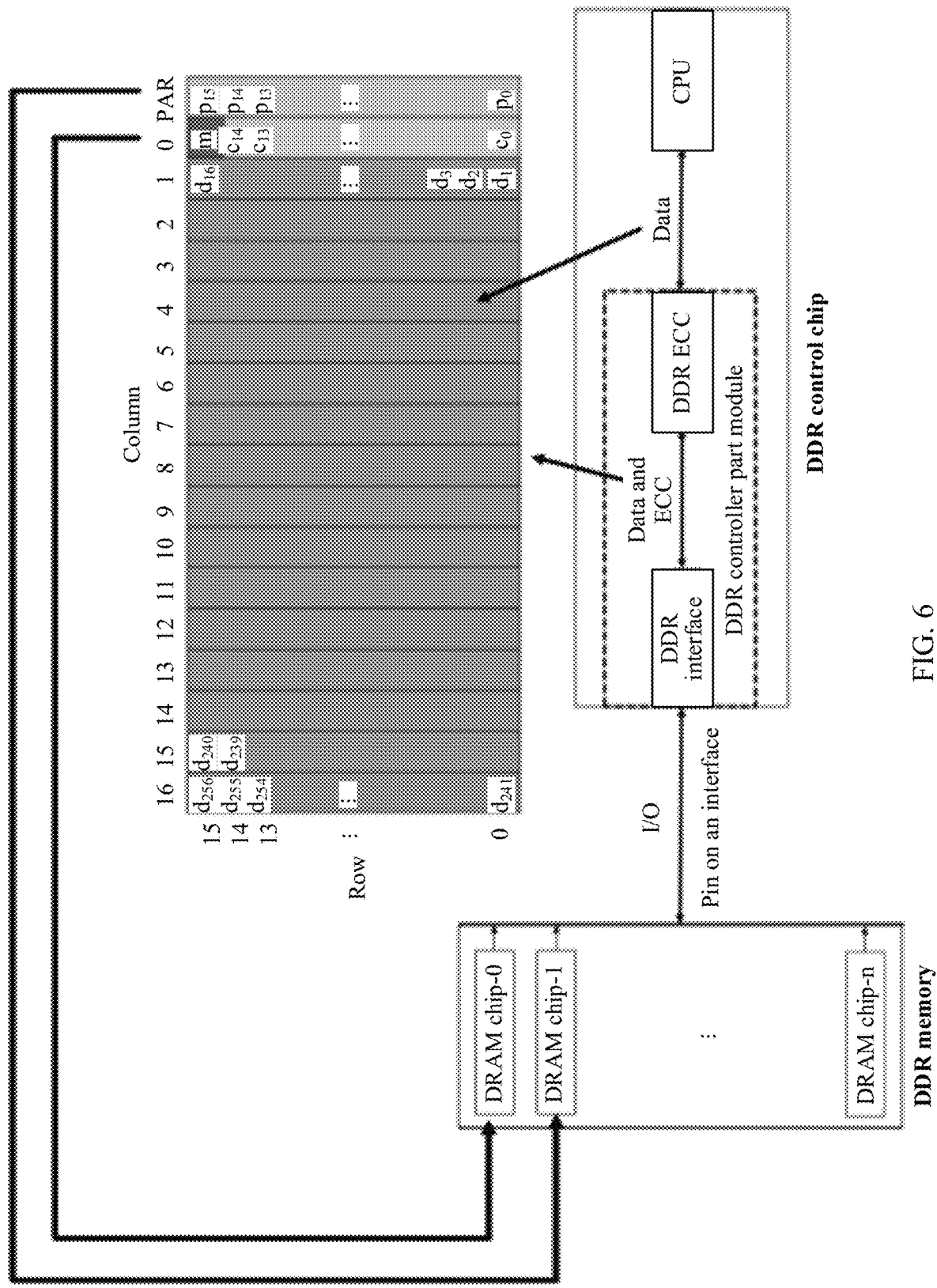
FIG. 6 is another schematic diagram of a codeword architecture according to this application.

It should be noted that, for ease of description, in the following example, the second data included in the user data in FIG. 3 and FIG. 4 is defined as Meta-Data. Clearly, as described above, the second data may alternatively be other data, and this is merely an example for description herein. As shown in FIG. 6, in a scenario of a codeword architecture in which a 16+2 granularity configuration is used and overall data is 288 bits, each bit in FIG. 5 is represented by a symbol, as shown in FIG. 6.

1. $d_1, \ldots, d_{256}$ represent the first data of 256 bits.
2. m represents one-bit Meta-Data (that is, the second data), and the first data and the Meta-Data are data obtained before encoding.

3. $c_0, \ldots, c_{14}$ represent 15-bit CRC-15 check bits obtained by performing a CRC algorithm on the first data and the Meta-Data.
4. $p_0, \ldots, p_{15}$ represent 16-bit parity check bits obtained by performing a parity check algorithm on the first data, the Meta-Data, and the CRC-15 check bits.

The following first describes a data flow direction in an encoding process and a decoding process with reference to FIG. 6.

In the encoding process, when a CPU needs to write first data of 16*16 bits and one-bit Meta-Data into a DDR memory (that is, an arrow direction corresponding to data in FIG. 6, corresponding to $d_1, d_2, d_3, \ldots, d_{256}$, and "m" in a codeword architecture), the first data and the Meta-Data are first encoded through a DDR ECC module, to generate CRC-15 check bits and parity check bits and obtain all data to be written (that is, an arrow direction corresponding to data and ECC in FIG. 6, corresponding to all data in the codeword architecture, namely, columns 0 to 16 and all column data in a column in which "PAR" is located). Therefore, an entire error correction codeword architecture can be constructed. Then, a DDR interface in FIG. 6 needs to be used with a pin on a chip (corresponding to the pin on the interface in FIG. 1), and 16-bit metadata of each column-i in all data in FIG. 6 is respectively written into a DRAM chip-i. For example, data in a column numbered "0" in the codeword architecture is written into a DRAM chip-0, data in a column numbered "PAR" in the codeword architecture is written into a DRAM chip-1, and data in columns numbered "1" to "16" in the codeword architecture is written into other DRAM chips.

In the decoding process, when the CPU needs to read the first data of 16*16 bits and the one-bit Meta-Data from the DDR memory, the CPU also needs to read corresponding check bits. Therefore, 16-bit metadata of each DRAM chip in the DDR memory is read through the pin on the chip in FIG. 6 and transmitted to the DDR interface. The read data needs to be decoded through the DDR ECC module. This step is performed because data stored in the DRAM chip may be incorrect due to aging of the DRAM chip or another factor (for example, in FIG. 6, incorrect data occurs in the DRAM chip-1, and this error pattern is chip-kill). Therefore, the DDR ECC module in a DDR control chip is required to perform error correction. Therefore, to transmit correct data from the DDR memory to the CPU, 16 bits need to be read from the 18 DRAM chips separately, and the read 288-bit metadata is arranged into the pattern of the codeword architecture shown in FIG. 6. Decoding is performed through the DDR ECC module, to obtain data processed by the DDR ECC module, and the data is input to the CPU.

The following describes an encoding process and a decoding process in a mathematical formula manner.

In the encoding process, a feasible primitive polynomial $g(x)=x^{15}+x^{10}+x^5+x+1$ is given. Assuming that first data and Meta-Data that are received before encoding are $d_1, \ldots, d_{256}$, and m in FIG. 6, $D(x)=x^{15} [d_{256}x^{256}+d_{255}x^{255}+ \ldots +d_2x^2+d_1x+m]$. Then, two encoding steps of CRC-15 check and parity check are performed in sequence.
1: Calculate CRC-15 check bits: $D(x) \bmod g(x)=C(x)=c_{14}x^{14}+c_{13}x^{13}+ \ldots +c_1x+c_0$.
2: Calculate parity check bits: $d_{241+j}+d_{225+j}+ \ldots +d_{1+j}+c_j=p_j$, where $j=0, \ldots, 14$ and $d_{256}+d_{240}+ \ldots +d_{16}+m=p_{15}$. Set $P(x)=p_{15}x^{15}+ \ldots +p_1x+p_0$.

Through the foregoing two steps, an entire 288-bit codeword may be obtained after encoding.

In the decoding process, assuming that first data received by a decoder is $d_1', \ldots, d_{256}'$, Meta-Data is m', CRC-15 check bits are $c_0', \ldots, c_{14}'$, and parity check bits are $p_0', \ldots, p_{15}'$, $D'(x)=x^{15} [d_{256}'x^{256}+d_{251}'x^{255}+ \ldots +d_2'x^2+d_1'x+m']$, $C'(x)=c_{14}'x^{14}+c_{13}'x^{13}+ \ldots +c_1'x+c_0'$, and $P'(x)=p_{15}'x^{15}+ \ldots +p_1'x+p_0'$.

Specifically, in the decoding process, decoding steps of CRC-15 check and parity check are performed in sequence.
1: Re-calculate CRC-15 check bits: re-calculate $C''(x)$ by using the first data and the Meta-Data received by the decoder and the encoding primitive polynomial $g(x)$, that is, calculate $D'(x) \bmod g(x)=C''(x)$.
2: Re-calculate parity check bits: re-calculate parity check bits $p''_j$ based on the first data, the Meta-Data, and the CRC-15 check bits that are received by the decoder and by summing up row-j, where $j=0, 1, \ldots, 15$, that is, after $d_{241+j}'+d_{225+j}'+ \ldots +d_{1+j}'+c_j'=p''_j$, where $j=0, \ldots, 14$ and $d_{256}'+d_{240}'+ \ldots +d_{16}'+m'=p''_{15}$ are calculated, $P''(x)=p''_{15}x^{15}+ \ldots +p''_1x+p''_0$.
3: It is determined based on the decoding step 1 and the decoding step 2:
  a. If $C''(x)=C'(x)$ and $P''(x)=P'(x)$, it is determined that there is no error.
  b. If $C''(x) \neq C'(x)$ and $P''(x)=P'(x)$, it is determined that correction cannot be performed.
  c. If $C''(x)=C'(x)$ and $P''(x) \neq P'(x)$:
    i. If $P''(x)-P'(x)=g(x)$, it is determined that correction cannot be performed (therefore, an uncorrectable error pattern is $x^{15}+x^{10}+x^5+x^1+x^0$, that is, $g(x)$).
    ii. In another case, it is determined that the first data is correct.
  d. If $C''(x) \neq C'(x)$ and $P''(x) \neq P'(x)$, received column-i data is corrected according to $P''(x)-P'(x)$, in other words, after $D'(x)+x^{16i}(P''(x)-P'(x))$ is calculated, where $i=0, 1, \ldots, 16$, a modulo operation is performed on $D'(x)+x^{16i}(P''(x)-P'(x))$ by using the encoding generator polynomial $g(x)$, to obtain a new remainder $C''_i(x)$, that is, $[D'(x)+x^{16i}(P''(x)-P'(x))] \bmod g(x)=C''_i(x)$ is calculated. If there is one and only one A, $C''_A(x)=C'(x)$, entire data obtained by correcting column-A is returned.
  e. In another case, it is reported that an error cannot be corrected.

The following describes implementation of an encoding process and a decoding process by using an example when one chip-kill occurs.

Figure 7:
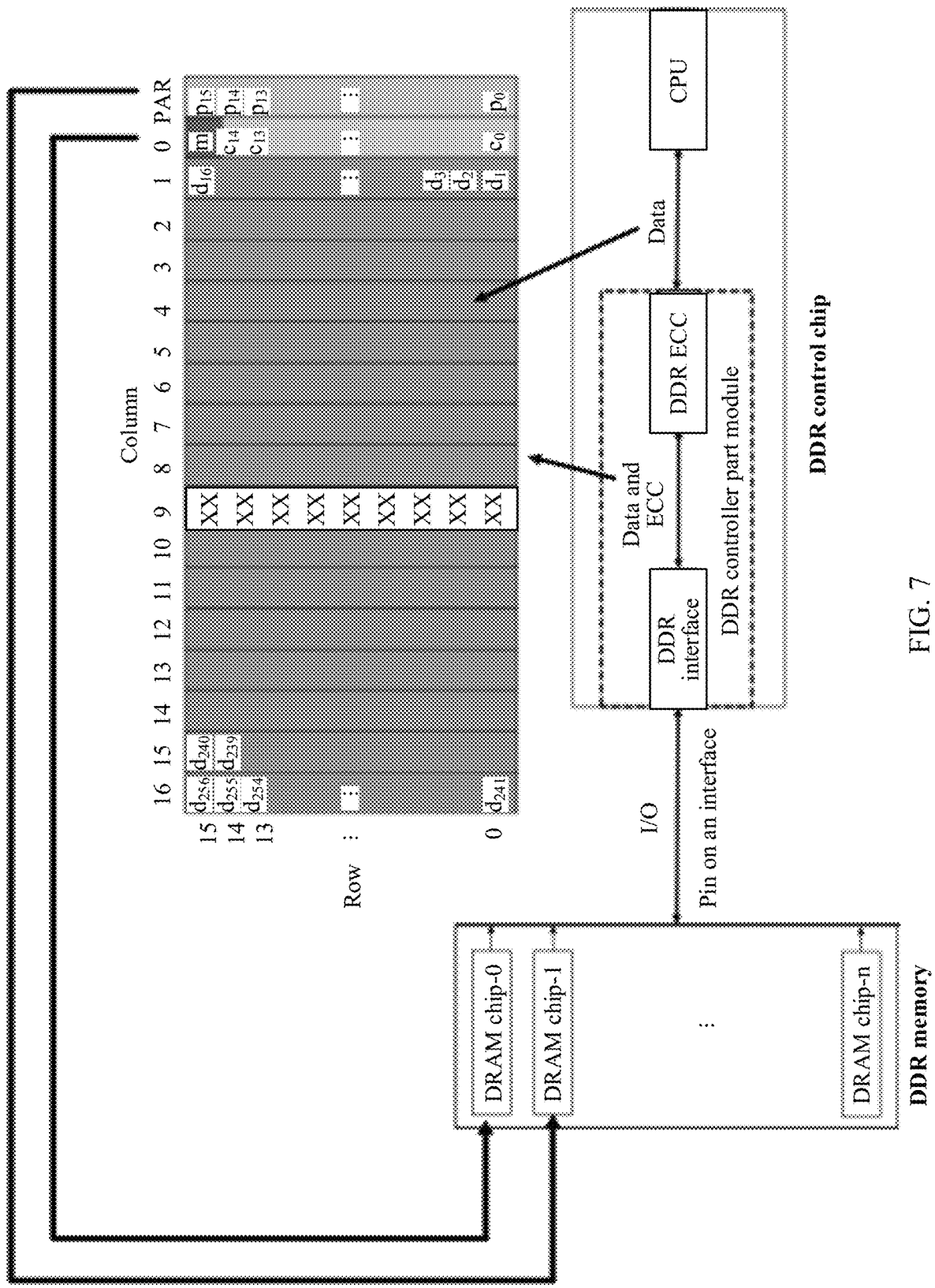
FIG. 7 is another schematic diagram of a codeword architecture according to this application.

For example, in the encoding process, it is set that correct data is the user data $d_1= \ldots =d_{256}=1$, Meta-Data m=1, the CRC-15 check bits $c_0, \ldots, c_{14}$ in FIG. 7, and the parity check bits $p_0, \ldots, p_{15}$, and $D(x)=x^{15} (x^{256}+x^{255}+ \ldots +x^2+x+1)$. A feasible primitive polynomial $g(x)=x^{15}+x^{10}+x^5+x+1$ is given. In this case, the following formula may be obtained based on an encoding scheme.

$$D(x) \bmod g(x)=C(x)=c_{14}x^{14}+c_{13}x^{13}+ \ldots +c_1x+c_0=x^{14}+x^{12}+x^8+x^6+x^4+x^3+x^2+1.$$

It can be learned, according to $d_{241+j}+d_{225+j}+ \ldots +d_{1+j}+c_j=p_j$, where $j=0, \ldots, 14$, and $d_{256}+d_{240}+ \ldots +d_{16}+m=p_{15}$, that $p_{15}=p_{14}=p_{12}=p_8=p_6=p_4=p_3=p_2=p_0=1$, and $p_{13}=p_{11}=p_{10}=p_9=p_7=p_5=p^1=0$. Set $P(x)=p_{15}x^{15}+ \ldots +p_1x+p_0=x^{15}+x^{14}+x^{12}+x^8+x^6+x^4+x^2+1$.

In an embodiment, if $e(x) g(x)$, in the decoding process, it is assumed that one chip-kill occurs in column-9 of data received by the decoder, as shown in FIG. 7. It is assumed that an error occurs in $d_{131}=d_{134}=d_{135}=0$, that is, an error occurs in bits corresponding to row-2, row-5, and row-6 in column-9. This error pattern is set to $e(x)=x^6+x^5+x^2$. In this case, $D'(x)=D(x)+x^{16 \times 9}e(x)$, $C'(x)=C(x)$, and $P'(x)=P(x)$. It may be obtained as follows based on a decoding scheme.

1: Calculate $D'(x) \bmod g(x) = C''(x) = x^{11} + x^8 + x^6 + 1$.
2: It can be learned, according to $d_{241+j} + d_{225+j} + \ldots + d_{1+j} + c_j + e_j = p''_j$, where $j=0, \ldots, 14$ and $d_{256} + d_{240} + \ldots + d_{16} + m + e_{15} = p''_{15}$, that $p''_{15} = p''_{14} = p''_{12} = p''_8 = p''_5 = p''_4 = p''_3 = p''_0 = 1$ and $P''_{13} = p''_{11} = p''_{10} = p''_9 = p''_7 = p''_6 = p''_2 = p''_1 = 0$. Set $P''(x) = p''_{15} x^{15} + p''_{14} x^{14} + \ldots + p''_1 x + p''_0 = x^{15} + x^{14} x^{12} + x^8 + x^5 + x^4 + x^3 + 1$.
3: Based on the decoding step 1 and the decoding step 2, because $C''(x) \neq C(x)$ and $P''(x) \neq P(x)$, enter step 3.d, and need to perform a modulo operation of $g(x)$ on column-i data after the column-i data is corrected according to $P''(x) - P(x) = e(x)$, that is, calculate $[D'(x) + x^{16i}(P''(x) - P(x))] \bmod g(x) = [D'(x) + x^{16i} e(x)] \bmod g(x) = C''_i(x)$, where $i = 0, 1, \ldots, 16$. For example, when $i = 10$, $[D'(x) + x^{160} e(x)] \bmod g(x) = [D(x) + x^{144} e(x) + x^{160} e(x)] \bmod g(x) \neq C(x)$ is calculated. As a result, when $i=10$, an error cannot be corrected. Finally, it can be learned that $C''_9(x) = C(x)$ may be enabled only when $i=9$. Then, entire data obtained by correcting column-9 is returned.

Figure 9:
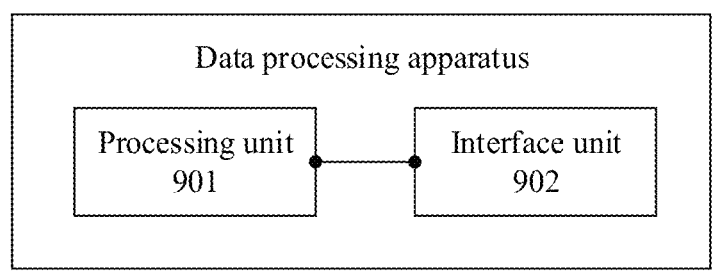
FIG. 9 is a schematic diagram of a data processing apparatus according to this application.

In an embodiment, if $e(x) = g(x)$, in the decoding process, it is assumed that one chip-kill occurs in column-9 of data received by the decoder, as shown in FIG. 9. It is assumed that an error occurs in $d_{129} = d_{130} = d_{134} = d_{139} = d_{144} = 0$, that is, an error occurs in bits corresponding to row-0, row-1, row-5, row-10, and row-15 in column-9. This error pattern is set to $e(x) = x^{15} + x^{10} + x^5 + x + 1$. In this case, $D'(x) = D(x) + x^{16 \times 9} e(x)$, $C'(x) = C(x)$, and $P'(x) = P(x)$. It may be obtained as follows based on a decoding scheme.

1: Calculate $D'(x) \bmod g(x) = C''(x) = x^{14} + x^{12} + x^8 + x^6 + x^4 + x^3 + x^2 + 1$.
2: It can be learned, according to $d_{241+j} + d_{225+j} + \ldots + d_{1+j} + c_j + e_j = p''_j$, where $j = 0, \ldots, 14$ and $d_{256} + d_{240} + \ldots + d_{16} + m + e_{15} = p''_{15}$, that $p''_{14} = p''_{12} = p''_{10} = p''_8 = p''_6 = p''_5 = p''_4 = p''_3 = p''_2 = p''_1 = 1$ and $P''_{15} = p''_{13} = p''_{11} = p''_9 = p''_7 = p''_0 = 0$. Set $P''(x) = p''_{15} x^{15} + p''^{14} x^{14} + \ldots + p''_1 x + p''_0 = x^{14} + x^{12} + x^{10} + x^8 + x^6 + x^5 + x^4 + x^3 + x^2 + x$.
3: Based on the decoding step 1 and the decoding step 2, because $C''(x) = C(x)$ and $P''(x) \neq P(x)$, enter step 3.c, and $P''(x) - P(x) = g(x)$, enter step 3.c.i. It can be learned that this error is an uncorrectable error pattern.

Therefore, when the CPU needs to obtain the first data $d_1, \ldots, d_{256}$, and Meta-Data m from the DDR memory, the CPU needs to read the corresponding CRC-15 check bits $c_0, \ldots, c_{14}$ and the corresponding parity check bits $p_0, \ldots, p_{15}$, so that 16-bit metadata of each DRAM chip in the DDR memory is read through the pin on the chip in FIG. 7 and transmitted to the DDR interface. However, due to some factors, in the DRAM chip-9 herein, the first data $d_{129}, \ldots, d_{144}$ that is originally stored in the DRAM chip-9 has an error (that is, the error pattern $e(x)$) and becomes $d_{129} + e_0, \ldots, d_{144} + e_{15}$. Consequently, column-9 that is read and arranged into a red box is error data, and needs to be decoded through the DDR ECC module (decoding as described above), to obtain data in a blue box in which the error data has been corrected in FIG. 7, that is, the first data $d_1, \ldots, d_{256}$, and the Meta-Data m, and the correct data may be transmitted to the CPU.

The following describes implementation of an encoding process and a decoding process by using an example when two random errors occur.

For example, it is set that correct data is the first data $d_1, \ldots, d_{256}$, the Meta-Data m, the CRC-15 check bits $c_0, \ldots, c_{14}$, and the parity check bits $p_0, \ldots, p_{15}$ in FIG. 6, and $D(x) = x^{15} [d_{256} x^{256} + d_{255} x^{255} + \ldots + d_2 x^2 + d_1 x + m]$. A feasible primitive polynomial $g(x) = x^{15} + x^{10} + x^5 + x + 1$ is given. In this case, the following formulas may be obtained based on an encoding scheme.

1: $D(x) \bmod g(x) = c_{14} x^{14} + c_{13} x^{13} + \ldots + c_1 x + c_0$.
2: $d_{241+j} + d_{225+j} + \ldots + d_{1+j} + c_j = p_j$, where $j = 0, \ldots, 14$ and $d_{256} + d_{240} + \ldots + d_{16} + m = p_{15}$. Set $P''(x) p_{15} x^{15} + p_{14} x^{14} + \ldots + p''_1 x + p''_0$.

Figure 8:
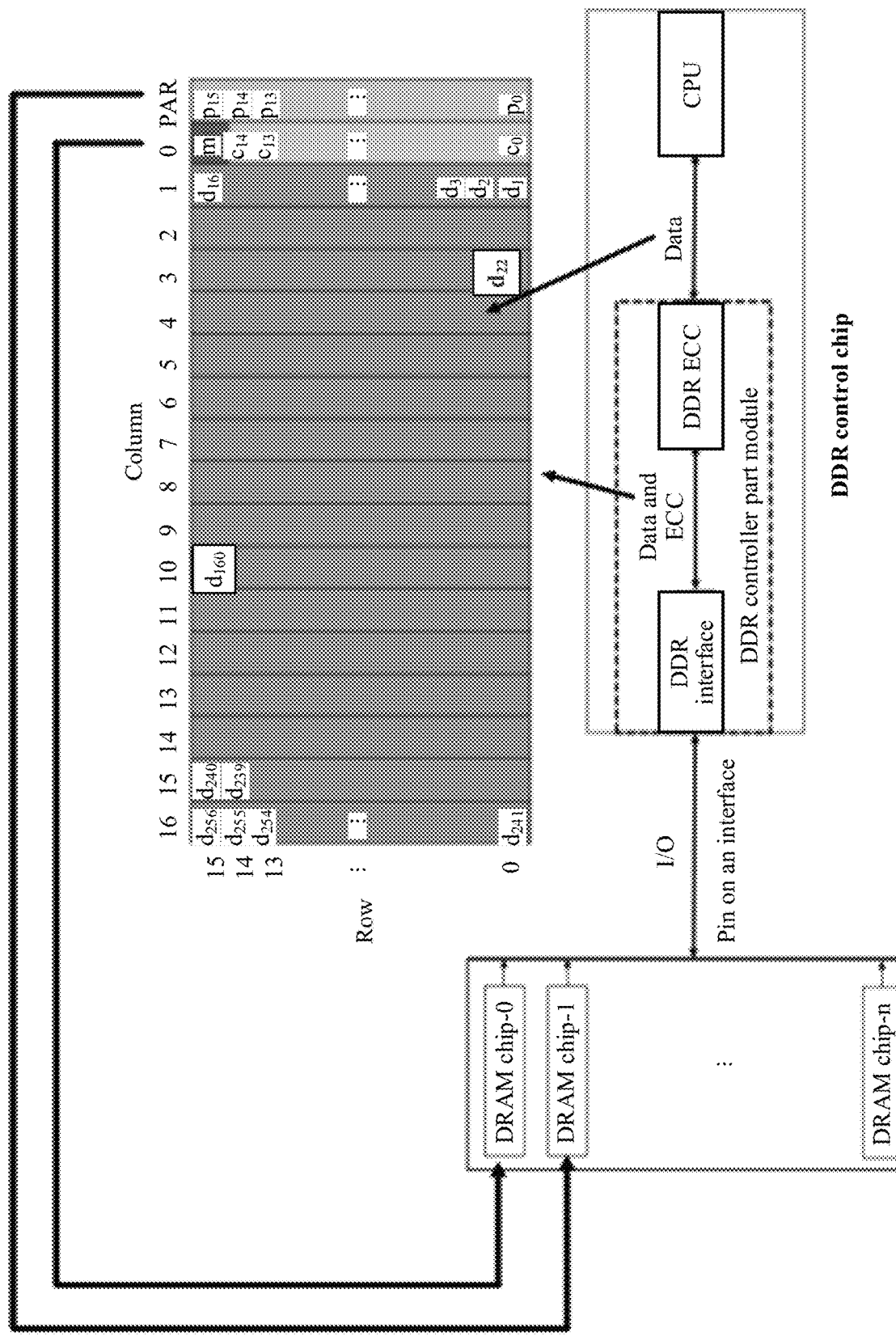
FIG. 8 is another schematic diagram of a codeword architecture according to this application.

In the decoding process, it is assumed that two random errors occur in $d_k$ and $d_t$ of data received by the decoder, as shown in FIG. 8. In this case, an error pattern is $e(x) = x^{15} (x^k + x^t)$. $D'(x) = D(x) + e(x)$, $C'(x) = C(x)$, and $P'(x) = P(x)$. It may be obtained as follows based on a decoding scheme.

1: Calculate $D'(x) \bmod g(x) = C''(x)$.
2: Calculate $d_{241+j} + d_{225+j} + \ldots + d_{1+j} + c_j + e_j = p''_j$, where $j = 0, \ldots, 14$ and $d_{256} + d_{240} + \ldots + d_{16} + m + e_{15} = p''_{15}$, and set $P''(x) = p''_{15} x^{15} + p''_{14} x^{14} + \ldots + p''_1 x + p''_0$.
3: Based on the decoding step 1 and the decoding step 2:
When two random errors occur in a same row (that is, $u = v$), $C''(x) \neq C(x)$ and $P''(x) = P(x)$. As a result, step 3.b is performed and an error cannot be corrected.
When two random errors occur in different rows (that is, $u \neq v$), $C''(x) \neq C(x)$ and $P''(x) \neq P(x)$. In this case, step 3.d is performed, and column-i data needs to be corrected according to $P''(x) - P(x)$ and then a modulo operation of $g(x)$ is performed on the column-i data. That is, $[D'(x) + x^{16i}(P''(x) - P(x))] \bmod g(x) = C''_i(x)$ is calculated, where $i = 0, 1, \ldots, 16$. There is no i to enable $C''_i(x) = C(x)$, and therefore an error cannot be corrected. In the example in FIG. 8, $P''(x) - P(x) = x^{15} + 1$ may be obtained. Therefore, $[D'(x) + x^{16i}(x^{15} + 1)] \bmod g(x) = C''_i(x)$ needs to be calculated, where $i = 0, 1, \ldots, 16$, and it is found that there is no i to enable $C''_i(x) = C(x)$. As a result, the error cannot be corrected.

In this way, when one-bit check bit is occupied to fill one-bit Meta-Data, a feasible primitive polynomial $g(x)$ needs to be selected in this implementation process, so that when one chip-kill occurs, only one error pattern is uncorrectable, and when any two random errors occur, an error can be detected. In addition, when one chip-kill occurs, if an error pattern is uncorrectable, the implementation process is capable of determining the uncorrectable error pattern, and therefore no wrong correction is caused.

It can be learned from the foregoing plurality of described implementation examples that, in the 16+2 chip configuration, each column in the codeword architecture has 16 bits. A feasible primitive polynomial $g(x)$ is given, and the following capabilities may be achieved in a related implementation example.

1: A one-bit check bit is supported in storing one-bit Meta-Data. A CRC-15 check and parity check error correction code is used in this implementation process. 15-bit CRC-15 check bits are obtained according to this algorithm and are filled in a column that may be used to place 16 bits. Therefore, one remaining bit may be used to place Meta-Data.
2: In a case of one chip-kill, each column has only one uncorrectable error pattern, and the uncorrectable error pattern is $g(x)$. It can be learned, based on $C''(x)$ obtained in decoding step 1 and $P''(x)$ obtained in decoding step 2, that when one chip-kill occurs, if the error pattern is $g(x)$, decoding step 3.c.i is performed subsequently, and therefore the error pattern is uncorrectable. If the error pattern is not $g(x)$, decoding step 3.d is performed subsequently, and there is a unique group of solutions, that is, the error pattern can be corrected definitely. Therefore, only one error pattern cannot be corrected.

3: When any two random errors occur (in different columns), an error needs to be detected. It can be learned, based on C"(x) obtained in decoding step 1 and P"(x) obtained in decoding step 2, that when two random errors occur (in different columns), if the two errors occur in a same row, decoding step 3.b is performed subsequently, and therefore the error cannot be corrected. If the two errors occur in different rows, decoding step 3.d is performed subsequently, and no solution can be found. Any two random errors (in different columns) can be detected.

4: In a case of one chip-kill, uncorrectable error patterns of all columns are the same and can be learned in advance, and no wrong correction is caused. The uncorrectable error pattern enters decoding step 3.c.i. In this step, it is given that if the error pattern is g(x), the error pattern is definitely uncorrectable. Therefore, a primitive polynomial g(x) is given during encoding, indicating that g(x) can be learned in advance.

The foregoing describes this application from a perspective of the method. The following describes a data processing apparatus provided in this application.

FIG. 9 is a schematic diagram of a data processing apparatus according to an embodiment of this application.

As shown in FIG. 9, the apparatus includes a processing unit 901 and an interface unit 902. The apparatus may be a computer device, or the apparatus may be a component (for example, a processor, a chip, or a chip system) in the computer device.

For example, the processing unit 901 may be configured to implement an implementation process performed by the CPU (or a DDR control chip including a CPU, or entire DDR hardware including a CPU) in any one of the embodiments in FIG. 1 and FIG. 6 to FIG. 8. The interface unit 902 may be configured to implement an implementation process performed by the DDR interface (or a DDR control part module including a DDR interface, a DDR control chip including a DDR interface, or entire DDR hardware including a DDR interface) in any one of the embodiments in FIG. 1 and FIG. 6 to FIG. 8.

In an embodiment, the processing unit 901 and the transceiver unit 902 included in the apparatus are configured to implement the following processes.

The processing unit 901 is configured to obtain user data, where the user data includes first data and second data.

The interface unit 902 is configured to write the first data into a first storage chips, where a is an integer greater than 0.

The interface unit 902 is further configured to write the second data and first check data into b second storage chips, where the first check data includes check data for the user data, and b is an integer greater than 0.

The interface unit 902 is further configured to write second check data into c third storage chips, where the second check data includes check data for both the user data and the first check data, and c is an integer greater than 0.

Based on the foregoing technical solution, after the processing unit 901 in the data processing apparatus obtains the user data that needs to be stored and that includes the first data and the second data, in a process in which the interface unit 902 in the data processing apparatus writes the user data into storage chips in a storage medium, the interface unit 902 separately stores the first data in the a first storage chips, and stores the second data in the b second storage chips different from the first storage chips. The interface unit 902 further writes the first check data into the b second storage chips, where the first check data includes the check data for the user data. In other words, the interface unit 902 places the second data in the user data and the first check data for the user data into the second storage chips, so that a part of data in the user data and a part of data in the check data share a same storage chip. Compared with a current design in which the user data can be stored only in a part of storage chips, in a design manner of reusing storage space corresponding to the second storage chip, a case in which a large amount of user data can be stored only by discarding a part of the user data or by setting an additional storage chip is avoided, to store more user data in a limited quantity of storage chips, optimize a data storage manner, and improve storage space utilization of a storage medium.

In an embodiment, the second data is metadata, and the metadata includes descriptive metadata, structured metadata, administrative metadata, reference metadata, statistical metadata, or legal metadata.

In an embodiment, a quantity of bits corresponding to the first data in each of the a first storage chips, a quantity of bits corresponding to the second data and the first check data in each of the b second storage chips, and a quantity of bits corresponding to the second check data in each of the c third storage chips are the same.

In an embodiment, a storage space size of each of the a first storage chips, a storage space size of each of the b second storage chips, and a storage space size of each of the c third storage chips are the same.

In an embodiment, the first check data includes a plurality of pieces of bit information, and each of the plurality of pieces of bit information in the first check data is check data for the user data.

In an embodiment, the second check data includes a plurality of pieces of bit information, first bit information in the plurality of pieces of bit information in the second check data is check data for both the user data and the first check data, and second bit information in the plurality of pieces of bit information in the second check data is check data for both the first data and the first check data.

In an embodiment, a quantity of bits in the first bit information is equal to a quantity of bits of the second data.

In an embodiment, both a value of b and a value of c are 1.

In an embodiment, the value of b is greater than 1. Each of the b storage chips includes a part of data in the second data and a part of data in the first check data.

In an embodiment, the first check data is check data obtained by encoding the user data based on a first encoding scheme and an m-order primitive polynomial, and m is an integer greater than 0.

In an embodiment, a value of a is an integer greater than 1 and less than or equal to $2^m-2$.

In an embodiment, a quantity of bits stored in each of the first storage chips, a quantity of bits stored in each of the second storage chips, and a quantity of bits stored in each of the third storage chips are the same, a value is m+1, m+2, or m+k, and k is an integer greater than 2.

In an embodiment, the first check data is cyclic redundancy check CRC check data.

In an embodiment, the second check data is parity check data.

In an embodiment, the processing unit 901 and the transceiver unit 902 included in the apparatus are configured to implement the following processes.

The interface unit 902 is configured to read first data from a first storage chips, where the first data is included in user data, the user data further includes second data, and a is an integer greater than 0.

The interface unit 902 is further configured to read the second data and first check data from b second storage chips, where the first check data includes check data for the user data, and b is an integer greater than 0.

The interface unit 902 is further configured to read second check data from c third storage chips, where the second check data includes check data for both the user data and the first check data, and c is an integer greater than 0.

The processing unit 901 is configured to check the user data based on the first check data and the second check data.

Based on the foregoing technical solution, in a process in which the interface unit 902 in the data processing device reads the user data from storage chips in a storage medium, the interface unit 902 separately reads the first data from the a first storage chips, and reads the second data from the b second storage chips. The interface unit 902 further reads the first check data from the b second storage chips. In other words, the second data in the user data and the first check data for the user data are read from the second storage chips, so that a part of data in the user data and a part of data in the check data are read from a same storage chip. Compared with a current design in which the user data can be stored only in a part of storage chips, in a design manner of reusing storage space corresponding to the second storage chip, a case in which a large amount of user data can be stored only by discarding a part of the user data or by setting an additional storage chip is avoided, to store more user data in a limited quantity of storage chips, optimize a data storage manner, and improve storage space utilization of a storage medium.

In an embodiment, the second data is metadata, and the metadata includes descriptive metadata, structured metadata, administrative metadata, reference metadata, statistical metadata, or legal metadata.

In an embodiment, a storage space size of each of the a first storage chips, a storage space size of each of the b second storage chips, and a storage space size of each of the c third storage chips are the same.

In an embodiment, a quantity of bits corresponding to the first data in each of the a first storage chips, a quantity of bits corresponding to the second data and the first check data in each of the b second storage chips, and a quantity of bits corresponding to the second check data in each of the c third storage chips are the same.

In an embodiment, the first check data includes a plurality of pieces of bit information, and each of the plurality of pieces of bit information in the first check data is check data for the user data.

In an embodiment, the second check data includes a plurality of pieces of bit information, first bit information in the plurality of pieces of bit information in the second check data is check data for both the user data and the first check data, and second bit information in the plurality of pieces of bit information in the second check data is check data for both the first data and the first check data.

In an embodiment, a quantity of bits in the first bit information is equal to a quantity of bits of the second data.

In an embodiment, both a value of b and a value of c are 1.

In an embodiment, the value of b is greater than 1. Each of the b storage chips includes a part of data in the second data and a part of data in the first check data.

In an embodiment, the first check data is check data obtained by encoding the user data based on a first encoding scheme and an m-order primitive polynomial, and m is an integer greater than 0.

In an embodiment, a value of a is an integer greater than 1 and less than or equal to $2^m-2$.

In an embodiment, a quantity of bits stored in each of the first storage chips, a quantity of bits stored in each of the second storage chips, and a quantity of bits stored in each of the third storage chips are the same, a value is m+1, m+2, or m+k, and k is an integer greater than 2.

In an embodiment, the first check data is cyclic redundancy check CRC check data.

In an embodiment, the second check data is parity check data.

In an embodiment, the processing unit 901 is configured to:
 encode the user data based on the m-order primitive polynomial, to obtain third check data;
 encode the user data and the third check data to obtain fourth check data; and check the user data based on the first check data, the second check data, the third check data, and the fourth check data.

In an embodiment, the processing unit 901 is configured to:
 when the first check data is the same as the third check data and a difference between the second check data and the fourth check data is the m-order primitive polynomial, determine that a data status of the first data is that there is an uncorrectable error.

In an embodiment, the processing unit is configured to:
 when the first check data is the same as the third check data and a difference between the second check data and the fourth check data is not 0 and is not the m-order primitive polynomial, determine that a data status of the first data is that there is no error;
 when the first check data is the same as the third check data and the second check data is the same as the fourth check data, determine that a data status of the first data is that there is no error;
 when the first check data is different from the third check data and the second check data is the same as the fourth check data, determine that a data status of the first data is that there is an uncorrectable error; or
 when the first check data is different from the third check data and the second check data is different from the fourth check data, determine that a data status of the first data is that there is a correctable error, and correct the first data based on the first check data, the second check data, the third check data, and the fourth check data.

It should be noted that the data processing apparatus shown in FIG. 9 may further perform descriptions corresponding to any one of the foregoing method embodiments, and achieve corresponding beneficial effects. For details, refer to the foregoing related descriptions. Details are not described herein again.

Figure 10:
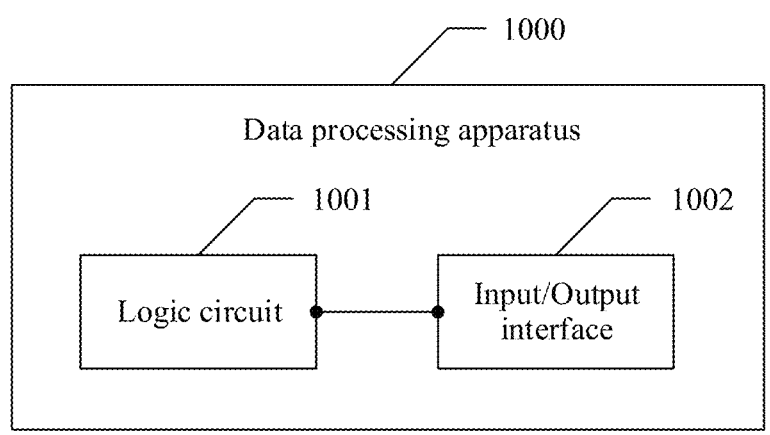
FIG. 10 is another schematic diagram of a data processing apparatus according to this application.

FIG. 10 is another schematic diagram of a structure of a data processing apparatus according to this application. The data processing apparatus 1000 includes a logic circuit 1001 and an input/output interface 1002. The data processing apparatus 1000 may be a chip or an integrated circuit.

The interface unit 902 shown in FIG. 9 may be an input/output interface 1002 in FIG. 10, and the input/output interface 1002 may include an input interface and an output interface. Alternatively, the communication interface may be a transceiver circuit, and the transceiver circuit may include an input interface circuit and an output interface circuit. In addition, the processing unit 901 shown in FIG. 9 may be the logic circuit 1001 in FIG. 10.

Specifically, the input/output interface 1002 is configured to write data or read data. The logic circuit 1001 is configured to control the input/output interface 1002 to write data, or is configured to control the input/output interface 1002 to read data.

In an embodiment, the logic circuit 1001 may further perform another step performed by the processing unit 901 and implement a corresponding beneficial effect, and the input/output interface 1002 may further perform another step performed by the interface unit 902 and implement a corresponding beneficial effect. Details are not described herein again.

In an embodiment, the logic circuit 1001 may be a processing apparatus, and some or all of functions of the processing apparatus may be implemented by using software. Some or all of the functions of the processing apparatus may be implemented by software.

In an embodiment, the processing apparatus may include a memory and a processor. The memory is configured to store a computer program, and the processor reads and executes the computer program stored in the memory, to perform corresponding processing and/or steps in any method embodiment.

In an embodiment, the processing apparatus may only include the processor. The memory configured to store the computer program is located outside the processing apparatus, and the processor is connected to the memory through a circuit/wire, to read and execute the computer program stored in the memory. The memory and the processor may be integrated together, or may be physically independent of each other.

In an embodiment, the processing apparatus may be one or more chips, or one or more integrated circuits. For example, the processing apparatus may be one or more field-programmable gate arrays (field-programmable gate arrays, FPGAs), application specific integrated circuits (application specific integrated circuits, ASICs), system on chips (system on chips, SoCs), central processing units (central processing units, CPUs), network processors (network processors, NPs), digital signal processors (digital signal processors, DSPs), micro controller units (micro controller units, MCUs), programmable logic devices (programmable logic devices, PLDs), or other integrated chips, or any combination of the foregoing chips or processors, or the like.

An embodiment of this application further provides a computer-readable storage medium storing one or more computer-executable instructions. When the computer-executable instructions are executed by a processor, the processor performs the method in the possible implementations of the data processing apparatus in the foregoing embodiments.

An embodiment of this application further provides a computer program product (also referred to as a computer program) storing one or more computers. When the computer program product is executed by a processor, the processor performs the method in the possible implementations of the data processing apparatus.

An embodiment of this application further provides a chip system. The chip system includes at least one processor, configured to support a terminal device in implementing functions in the foregoing possible implementations of the data processing apparatus. Optionally, the chip system further includes an interface circuit, and the interface circuit provides program instructions and/or data for the at least one processor. In a possible design, the chip system may further include a memory. The memory is configured to store program instructions and data that are necessary for the terminal device. The chip system may include a chip, or include a chip and another discrete device.

In the several embodiments provided in this application, it should be understood that the disclosed system, apparatus, and method may be implemented in other manners. For example, the described apparatus embodiments are merely examples. For example, division into the units is merely logical function division, and there may be another division manner during actual implementation. For example, a plurality of units or components may be combined or may be integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit. When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method for processing data, comprising:
   obtaining user data, wherein the user data comprises first data and second data;
   writing the first data into one or more first storage chips;
   writing the second data and first check data into one or more second storage chips, wherein the first check data comprises check data for the user data, wherein a part of data in the user data and a part of data in the check data share a same storage chip; and writing second check data into one or more third storage chips, wherein the second check data comprises check data for both the user data and the first check data, wherein the first check data is obtained by encoding the user data based on a first encoding scheme and an m-order primitive polynomial, m is an integer greater than 0, and a quantity of the first storage chips is greater than 1 and less than or equal to $2^m-2$.

2. The method according to claim 1, wherein the second data is metadata that comprises descriptive metadata, structured metadata, administrative metadata, reference metadata, statistical metadata, or legal metadata.

3. The method according to claim 1, wherein a quantity of bits corresponding to the first data in each of the first storage chips, a quantity of bits corresponding to the second data and the first check data in each of the second storage chips, and a quantity of bits corresponding to the second check data in each of the third storage chips are the same.

4. The method according to claim 1, wherein the first check data comprises a plurality of pieces of bit information, each containing check data for the user data.

5. The method according to claim 1, wherein the second check data comprises a plurality of pieces of bit information, including first bit information and second bit information, and the first bit information comprises check data for both the user data and the first check data.

6. The method according to claim 5, wherein a quantity of bits in the first bit information is equal to a quantity of bits of the second data.

7. The method according to claim 5, wherein the second bit information comprises check data for both the first data and the first check data.

8. A method for processing data, comprising:
reading first data from one or more first storage chips, wherein the first data is comprised in user data that comprises second data;
reading the second data and first check data from one or more second storage chips, wherein the first check data comprises check data for the user data, wherein a part of data in the user data and a part of data in the check data share a same storage chip;
reading second check data from one or more third storage chips, wherein the second check data comprises check data for both the user data and the first check data; and
checking the user data based on the first check data and the second check data, wherein the first check data is obtained by encoding the user data based on a first encoding scheme and an m-order primitive polynomial, m is an integer greater than 0, and a quantity of the first storage chips is greater than 1 and less than or equal to $2^m-2$.

9. The method according to claim 8, wherein the second data is metadata that comprises descriptive metadata, structured metadata, administrative metadata, reference metadata, statistical metadata, or legal metadata.

10. The method according to claim 8, wherein a quantity of bits corresponding to the first data in each of the first storage chips, a quantity of bits corresponding to the second data and the first check data in each of the second storage chips, and a quantity of bits corresponding to the second check data in each of the third storage chips are the same.

11. The method according to claim 8, wherein the first check data comprises a plurality of pieces of bit information, each containing check data for the user data.

12. The method according to claim 8, wherein the second check data comprises a plurality of pieces of bit information, including first bit information and second bit information, and the first bit information comprises check data for both the user data and the first check data.

13. The method according to claim 12, wherein a quantity of bits in the first bit information is equal to a quantity of bits of the second data.

14. The method according to claim 12, wherein the second bit information comprises check data for both the first data and the first check data.

15. The method according to claim 8, wherein a quantity of bits stored in each of the first storage chips, a quantity of bits stored in each of the second storage chips, and a quantity of bits stored in each of the third storage chips are the same, a quantity of the first storage chips is m+1, m+2, or m+k, and k is an integer greater than 2.

16. A data processing apparatus, comprising:
a processor; and
a memory configured to store a program or instructions, which when executed by the processor, cause the data processing apparatus to:
obtain user data, wherein the user data comprises first data and second data;
write the first data into one or more first storage chips,
write the second data and first check data into one or more second storage chips, wherein the first check data comprises check data for the user data, wherein a part of data in the user data and a part of data in the check data share a same storage chip, and
write second check data into one or more third storage chips, wherein the second check data comprises check data for both the user data and the first check data, wherein the first check data is obtained by encoding the user data based on a first encoding scheme and an m-order primitive polynomial, m is an integer greater than 0, and a quantity of the first storage chips is greater than 1 and less than or equal to $2^m-2$.

17. A data processing apparatus, comprising:
a processor; and
a memory configured to store a program or instructions, which when executed by the processor, cause the data processing apparatus to:
read first data from one or more first storage chips, wherein the first data is comprised in user data, the user data further comprises second data,
read the second data and first check data from one or more second storage chips, wherein the first check data comprises check data for the user data, wherein a part of data in the user data and a part of data in the check data share a same storage chip,
read second check data from one or more third storage chips, wherein the second check data comprises check data for both the user data and the first check data, and
check the user data based on the first check data and the second check data, wherein the first check data is obtained by encoding the user data based on a first encoding scheme and an m-order primitive polynomial, m is an integer greater than 0, and a quantity of the first storage chips is greater than 1 and less than or equal to $2^m-2$.

* * * * *